United States Patent
Suzuki et al.

(10) Patent No.: US 11,795,334 B2
(45) Date of Patent: Oct. 24, 2023

(54) PHOTO-CURABLE INK COMPOSITION AND METHOD FOR FORMING IMAGE

(71) Applicant: FUJIFILM CORPORATION, Tokyo (JP)

(72) Inventors: Shota Suzuki, Kanagawa (JP); Noriaki Sato, Kanagawa (JP); Ichiro Koyama, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 983 days.

(21) Appl. No.: 16/519,020

(22) Filed: Jul. 23, 2019

(65) Prior Publication Data
US 2019/0345352 A1    Nov. 14, 2019

Related U.S. Application Data

(63) Continuation of application No. PCT/JP2018/006317, filed on Feb. 21, 2018.

(30) Foreign Application Priority Data

Feb. 24, 2017  (JP) ............................. JP2017-034089

(51) Int. Cl.
| | | |
|---|---|---|
| C09D 11/101 | (2014.01) | |
| C08F 2/48 | (2006.01) | |
| C09D 11/107 | (2014.01) | |
| C09D 11/30 | (2014.01) | |

(52) U.S. Cl.
CPC ............ *C09D 11/101* (2013.01); *C08F 2/48* (2013.01); *C09D 11/107* (2013.01); *C09D 11/30* (2013.01)

(58) Field of Classification Search
CPC ....... C08F 2/48; C09D 11/101; C09D 11/107; C09D 11/30
See application file for complete search history.

(56) References Cited

U.S. PATENT DOCUMENTS

| | | |
|---|---|---|
| 2009/0202795 A1 | 8/2009 | Hayata et al. |
| 2010/0313782 A1 | 12/2010 | Loccufier et al. |
| 2011/0124768 A1 | 5/2011 | Claes et al. |
| 2012/0113201 A1 | 5/2012 | Kagose et al. |
| 2013/0236654 A1 | 9/2013 | Claes et al. |
| 2014/0050858 A1 | 2/2014 | Loccufier et al. |
| 2015/0050427 A1 | 2/2015 | Claes et al. |

FOREIGN PATENT DOCUMENTS

| | | |
|---|---|---|
| CN | 101503587 A | 8/2009 |
| CN | 102585599 A | 7/2012 |
| CN | 106366755 A | 2/2017 |
| EP | 2471879 A1 | 7/2012 |
| IN | 201617008189 A | 7/2016 |
| JP | H04-39317 A | 2/1992 |
| JP | H10-279854 A | 10/1998 |
| JP | 2004-182793 A | 7/2004 |
| JP | 2005-126540 A | 5/2005 |
| JP | 2008-248118 A | 10/2008 |
| JP | 2009-215453 A | 9/2009 |
| JP | 2011-500932 A | 1/2011 |
| JP | 2011-502188 A | 1/2011 |
| JP | 2011-162716 A | 8/2011 |

OTHER PUBLICATIONS

Machine Translation of JP 2008-248118A (Year: 2008).*
Office Action dated Jun. 9, 2022, issued by the EPO in corresponding EP Patent Application No. EP18757797.8.
Jun Nie, "Progress in Cationic UV-Curing", Coatings Technology & Abstracts, Coatings Review 10, p. 1-9, Oct. 31, 2007.
Ahmed Akelah, "Preparation and application of functional polymers-II. Preparation of vinyl ethers and thioethers using polymer-supported phosphonium salts", European Polymer Journal 18, p. 559-p. 561, Dec. 31, 1982.

(Continued)

*Primary Examiner* — Sathavaram I Reddy
(74) *Attorney, Agent, or Firm* — Solaris Intellectual Property Group, PLLC

(57) ABSTRACT

A photo-curable ink composition is provided, the composition including: a polymer including a structural unit represented by General Formula 1 below; and a radical-polymerizable monomer, in which a total content of a monofunctional radical-polymerizable monomer and a bifunctional radical-polymerizable monomer is 50% by mass or more with respect to a total amount of the composition:

General Formula 1

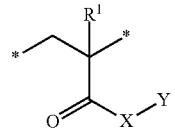

in which, in General Formula 1: $R^1$ represents a hydrogen atom or a methyl group; X represents an oxygen atom or $-NR^2-$, $R^2$ representing a hydrogen atom or an alkyl group having 1 to 8 carbon atoms; Y represents a group including at least one selected from the group consisting of a thioether structure, a phosphorus atom, and a hindered phenol structure; and * represents a bonding site.

10 Claims, No Drawings

(56) References Cited

OTHER PUBLICATIONS

English language translation of the following: Office action dated Aug. 12, 2021 from the SIPO in a Chinese patent application No. 201880013265.1 corresponding to the instant patent application. This office action translation is submitted now in order to supplement the understanding of the cited references which are being disclosed in the instant Information Disclosure Statement.
Handbook of Ink Technology, Linear University, p. 886, Printing Industry Press, May 31, 2009.
English language translation of the following: Office action dated Feb. 25, 2022 from the SIPO in a Chinese patent application No. 201880013265.1 corresponding to the instant patent application. This office action translation is submitted now in order to supplement the understanding of the cited references which are being disclosed in the instant Information Disclosure Statement.
English language translation of the following: Office action dated Mar. 17, 2020 from the JPO in a Japanese patent application No. 2019-501388 corresponding to the instant patent application.
Extended European Search Report dated Jan. 31, 2020, issued in corresponding EP Patent Application No. 18757797.8.
International Search Report issued in International Application No. PCT/JP2018/006317 dated Apr. 24, 2018.
Written Opinion of the ISA issued in International Application No. PCT/JP2018/006317 dated Apr. 24, 2018.

\* cited by examiner

PHOTO-CURABLE INK COMPOSITION AND METHOD FOR FORMING IMAGE

CROSS-REFERENCE TO RELATED APPLICATIONS

This application is a continuation application of International Application No. PCT/JP2018/006317, filed Feb. 21, 2018, the disclosure of which is incorporated herein by reference in its entirety. Further, this application claims priority from Japanese Patent Application No. 2017-034089, filed Feb. 24, 2017, the disclosure of which is incorporated herein by reference in its entirety.

BACKGROUND OF THE INVENTION

1. Field of the Invention

The present disclosure relates to a photo-curable ink composition and a method for forming an image.

2. Description of the Related Art

Hitherto, photo-curable ink compositions having properties of being cured by active energy rays (hereinafter also referred to as "light") such as ultraviolet rays are known. Photo-curable inks can be used in various recording methods and are also expected as, for example, inks for ink jet recording, with which recording can be easily performed on any recording medium.

For example, from the viewpoint of obtaining a high-quality image having good color reproducibility, an ink-jet ink composition that contains an organic pigment, a polymer compound including a thioether structure and serving as a pigment dispersing agent, and an active radiation-curable compound and that has good dispersibility of the pigment and good stability thereof has been disclosed (refer to, for example, JP2009-215453A).

As a technology relating to adhesion of an ink, an ultraviolet-curable ink-jet ink has been disclosed in which a phosphorus compound serving as a monomer component is contained in order to improve fixability to a non-absorbable material such as a metal (refer to, for example, JP2005-126540A).

A technology has been disclosed in which, in order to improve light resistance in a non-curable ink containing a cationic polymer, in addition to the cationic polymer, a second polymer which is a polymer of a monomer having an ultraviolet absorber which is a moiety having an ultraviolet absorption activity is used (refer to, for example, JP1998-279854A (JP-H10-279854A)).

SUMMARY OF THE INVENTION

Regarding ink compositions, improvements in image properties such as color reproducibility and weather resistance have been aimed, and ink compositions have been applied to an image recording method using an ink jet method, which has been widely used in recent years.

This point also applies to ink compositions provided with photo-curability. In order to correspond to broad applications, for example, studies on adhesion of images to plastic substrates and the like have also been actively performed.

However, the curing performance of such ink compositions having photo-curability tends to change with time. For example, in an existing composition to which a low-molecular-weight antioxidant or the like is merely added, hardness after curing is insufficient, which may result in a blocking phenomenon and poor adhesion to a substrate.

The present disclosure has been made in view of the circumstances described above.

An object of an embodiment of the present invention is to provide a photo-curable ink composition having good hardness of an image after curing, good blocking resistance, and good adhesion to a substrate.

An object of another embodiment of the present invention is to provide an image forming method for forming an image having good hardness, good blocking resistance, and good adhesion to a recording medium.

Specific means for achieving the above objects include the following embodiments.

<1> A photo-curable ink composition containing a polymer including a structural unit represented by General Formula 1 below; and a radical-polymerizable monomer, in which a total content of a monofunctional radical-polymerizable monomer and a bifunctional radical-polymerizable monomer is 50% by mass or more with respect to a total amount of the composition.

General Formula 1

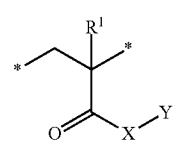

In General Formula 1: $R^1$ represents a hydrogen atom or a methyl group; X represents an oxygen atom or $-NR^2-$, $R^2$ representing a hydrogen atom or an alkyl group having 1 to 8 carbon atoms; Y represents a group including at least one selected from the group consisting of a thioether structure, a phosphorus atom, and a hindered phenol structure; and * represents a bonding site.

<2> The photo-curable ink composition according to <1>, in which the structural unit represented by General Formula 1 includes at least one structural unit selected from the group consisting of General Formulae 2 to 4 below.

General Formula 2

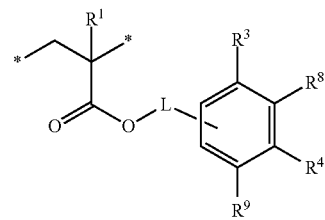

General Formula 3

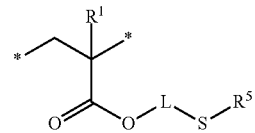

General Formula 4

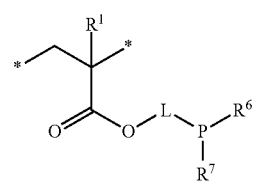

In General Formulae 2 to 4: $R^1$ represents a hydrogen atom or a methyl group; L represents a single bond or a divalent linking group; $R^3$, $R^4$, $R^5$, $R^6$, and $R^7$ each independently represent a linear, branched, alicyclic, or aromatic hydrocarbon group having 1 to 18 carbon atoms; $R^6$ and $R^7$ may be bonded to each other to form a ring structure; one of $R^8$ or $R^9$ represents a hydroxy group, and the other represents a hydrogen atom; and * represents a bonding site.

<3> The photo-curable ink composition according to <1> or <2>, in which the polymer includes at least one selected from the group consisting of a structural unit having an amide structure and a structural unit having a cyclic hydrocarbon group other than the structural unit represented by General Formula 1.

<4> The photo-curable ink composition according to any one of <1> to <3>, in which a ratio of the structural unit represented by General Formula 1 is 10% by mass or more with respect to a total mass of all structural units in the polymer.

<5> The photo-curable ink composition according to <4>, in which the ratio of the structural unit represented by General Formula 1 is from 30% by mass to 70% by mass with respect to the total mass of all the structural units in the polymer.

<6> The photo-curable ink composition according to any one of <1> to <5>, in which the polymer has a weight-average molecular weight of from 1,000 to 50,000.

<7> The photo-curable ink composition according to any one of <1> to <6>, in which a content of the polymer is from 0.5% by mass to 10.0% by mass with respect to a total mass of the photo-curable ink composition.

<8> The photo-curable ink composition according to any one of <1> to <7>, in which a ratio of a content of the polymer to a content of the radical-polymerizable monomer is from 3% by mass to 5% by mass.

<9> The photo-curable ink composition according to any one of <1> to <8>, further containing a photopolymerization initiator.

<10> A method for forming an image, the method having applying the photo-curable ink composition according to any one of <1> to <9> to a recording medium (preferably by an ink jet method); and irradiating the photo-curable ink composition applied to the recording medium with an active energy ray.

According to an embodiment of the present invention, there is provided a photo-curable ink composition having good hardness of an image after curing, good blocking resistance, and good adhesion to a substrate.

According to another embodiment of the present invention, there is provided an image forming method for forming an image having good hardness, good blocking resistance, and good adhesion to a recording medium.

DESCRIPTION OF THE PREFERRED EMBODIMENTS

Hereafter, a photo-curable ink composition of the present disclosure and a method for forming an image of the present disclosure using a photo-curable ink composition will be described in detail.

In the present specification, a range of numerical values shown by using "to" means a range including a numerical value described before "to" as a minimum and a numerical value described after "to" as a maximum. In ranges of numerical values that are described in stages in the present disclosure, an upper limit value or a lower limit value described in a certain range of numerical values may be replaced by an upper limit value or a lower limit value in a range of numerical values in the description of another stage. In ranges of numerical values described in the present disclosure, an upper limit value or a lower limit value described in a certain range of numerical values may be replaced by a value disclosed in Examples.

In the present specification, when a plurality of substances corresponding to each component are present in a composition, an amount of each component in the composition means a total amount of the plurality of substances that are present in the composition unless otherwise stated.

In the present specification, when a plurality of structural units corresponding to each structural unit are present in a polymer, an amount of each structural unit in the polymer means a total amount of the plurality of structural units that are present in the polymer unless otherwise stated.

In the present specification, the term "step" refers to not only an independent step but also a step that is not clearly distinguished from another step as long as a desired purpose of the step is achieved.

In the present specification, the term "light" covers a concept that includes active energy rays such as γ-rays, γ-rays, electron beams, ultraviolet rays, visible rays, and infrared rays.

In the present specification, ultraviolet rays may be referred to as "UV (ultraviolet) light".

In the present specification, light emitted from an LED (light emitting diode) light source may be referred to as "LED light".

In the present specification, the term "(meth)acrylic acid" covers a concept that includes both acrylic acid and methacrylic acid, the term "(meth)acrylate" covers a concept that includes both acrylate and methacrylate, and the term "(meth)acryloyl group" covers a concept that includes both an acryloyl group and a methacryloyl group.

In the present specification, the symbol "*" in a chemical formula represents a bonding site.

Photo-Curable Ink Composition

A photo-curable ink composition (hereinafter, also simply referred to as an "ink composition" or "ink") of the present disclosure contains at least a polymer including a structural unit represented by General Formula 1 below and a radical-polymerizable monomer. A total content of a monofunctional radical-polymerizable monomer and a bifunctional radical-polymerizable monomer in the radical-polymerizable monomer is in a range of 50% by mass or more with respect to a total amount of the composition. The operation and the effect by the photo-curable ink composition of the present disclosure are considered as follows.

In general, antioxidants may be added for the purpose of suppressing degradation of polymers. The degradation of polymers is due to oxidation degradation caused by an action between heat, light, mechanical force, a metal ion, or the like and oxygen and is caused by elementary reactions including a radical chain reaction. To prevent oxidation degradation, it is important that radical reactions be terminated at an initial stage of degradation to terminate autoxidation. Accordingly, blending of low-molecular-weight compounds, so-called antioxidants, which terminate a chain in each process of the autoxidation cycle, for example, which suppress radical generation, scavenge radicals, or cause ionic decomposition of a hydroperoxide, has hitherto been performed. The antioxidants are classified as follows in accordance with the process of suppressing a chain in autoxidation.

(1) Chain initiation inhibitors (light stabilizers, metal deactivators, and antiozonants)
(2) Radical scavengers (phenol-based oxidation inhibitors and amine-based oxidation inhibitors)
(3) Peroxide decomposers (sulfur-based oxidation inhibitors and phosphorus-based oxidation inhibitors)

However, in order to suppress oxidation degradation due to an oxygen radical and to improve photo-curing reactivity, only the addition of existing antioxidants is not necessarily sufficient. The hardness of an image and blocking resistance may be insufficient after curing, and adhesion to a substrate (in particular, a non-absorbable substrate) may also be poor.

Therefore, in the photo-curable ink composition of the present disclosure, a specific structure that contributes to prevention of oxidation is added to a structure of a polymer in a composition containing a radical-polymerizable monomer and the polymer.

This configuration can terminate an oxygen radical reaction at an initial stage of degradation and achieves a high effect of suppressing radical polymerization inhibition due to oxygen. Accordingly, in the photo-curable ink composition of the present disclosure, curing reactivity in a curing portion is significantly improved, an improvement effect of blocking in a cured film is exhibited when a cured film such as an image is formed, the hardness improves, and adhesion of the curing portion to a substrate (in particular, non-absorbable substrate) (adhesion to a substrate) also significantly improves compared with compositions containing existing low-molecular-weight compounds called antioxidants.

Components contained in a photo-curable ink composition of the present disclosure will now be described.

Polymer Including Structural Unit Represented by General Formula 1

A photo-curable ink composition of the present disclosure contains at least one polymer including a structural unit represented by General Formula 1 below (hereinafter also referred to as a "structural unit A" as required). The structural unit represented by General Formula 1 has, in a side chain bonded to a main chain structure of a polymer (that is, in a substituent Y), a structure selected from the group consisting of a thioether structure, a phosphorus atom, and a hindered phenol structure. In the photo-curable ink composition of the present disclosure, since a high-molecular-weight polymer has a function of preventing oxidation, oxidation degradation due to an oxygen radical is reduced, and the effect of suppressing radical polymerization inhibition caused by oxygen is high, compared with the case where a low-molecular-weight compound, so-called an antioxidant, is contained. Therefore, according to the photo-curable ink composition of the present disclosure, blocking of a film (including an image) after curing is suppressed to be low, and hardness and adhesion to a substrate significantly improve.

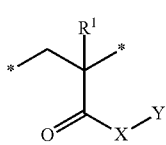

General Formula 1

In General Formula 1, $R^1$ represents a hydrogen atom or a methyl group.

X represents an oxygen atom or $-NR^2-$, $R^2$ representing a hydrogen atom or an alkyl group having 1 to 8 carbon atoms.

Examples of the alkyl group having 1 to 8 carbon atoms in $R^2$ include a methyl group, an ethyl group, a propyl group, a butyl group, a hexyl group, and an octyl group. Of these, an alkyl group having 1 to 4 carbon atoms is preferred.

$R^2$ is preferably a hydrogen atom, a methyl group, or an ethyl group and more preferably a hydrogen atom or a methyl group.

In particular, X is preferably an oxygen atom from the viewpoint of a reduction in the viscosity of the ink and ejection stability during ejection by an ink jet method.

In General Formula 1, Y represents a group including at least one selected from the group consisting of a thioether structure, a phosphorus atom, and a hindered phenol structure. The group having a thioether structure, a phosphorus atom, or a hindered phenol structure is preferably a group having a function of preventing oxidation and contributes to an improvement in hardness after curing, blocking resistance, and adhesion of the photo-curable ink composition.

An example of the group having a thioether structure is $-L-S-R^5$.

L represents a single bond or a divalent linking group. $R^5$ represents a linear, branched, alicyclic, or aromatic hydrocarbon group having 1 to 18 carbon atoms.

Details of the divalent linking group in L and $R^5$ have the same definition as in L and $R^5$, respectively, in General Formula 3 below, and preferred embodiments thereof are also the same as those of L and $R^5$ in General Formula 3.

Examples of the group represented by $-L-S-R^5$ include $-CH_2CH_2-OCO-CH_2CH_2-S-C_{12}H_{25}$, $-CH_2CH_2-OCO-CH_2CH_2-S-C_{12}H_{25}$, $-CH_2CH_2-CO-CH_2CH_2-S-C_{12}H_{25}$, and $-CH_2CH_2-COO-CH_2CH_2-S-C_{12}H_{25}$.

An example of the group having a phosphorus atom is $-L-PR^6R^7$.

L represents a single bond or a divalent linking group. $R^6$ and $R^7$ each independently represent a linear, branched, alicyclic, or aromatic hydrocarbon group that has 1 to 18 carbon atoms and that may have a substituent, and may be bonded to each other to form a ring structure.

Details of the divalent linking group in L, $R^6$, and $R^7$ have the same definition as in L, $R^6$, and $R^7$, respectively, in General Formula 4 below, and preferred embodiments thereof are also the same as those of L, $R^6$, and $R^7$ in General Formula 4.

Examples of the group represented by $-L-PR^6R^7$ include groups having the following structures.

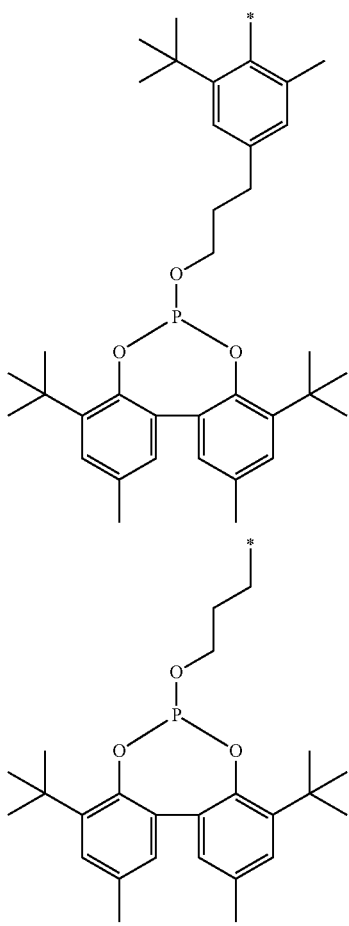

An example of the group having a hindered phenol structure is a substituent represented by Formula (y1) below.

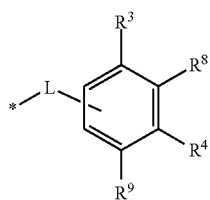
(y1)

In Formula (y1), L represents a single bond or a divalent linking group. $R^3$ and $R^4$ each independently represent a linear, branched, alicyclic, or aromatic hydrocarbon group having 1 to 18 carbon atoms. One of $R^8$ or $R^9$ represents a hydroxy group, and the other represents a hydrogen atom.

Details of the divalent linking group in L, $R^3$, and $R^4$ have the same definition as in L, $R^3$, and $R^4$, respectively, in General Formula 2 below, and preferred embodiments thereof are also the same as those of L, $R^3$, and $R^4$ in General Formula 2.

Examples of the group represented by Formula (y1) include groups having the following structures.

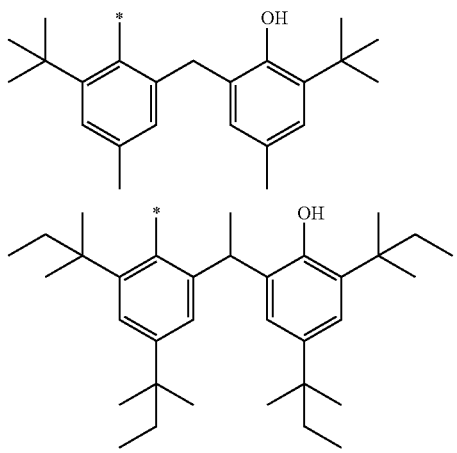

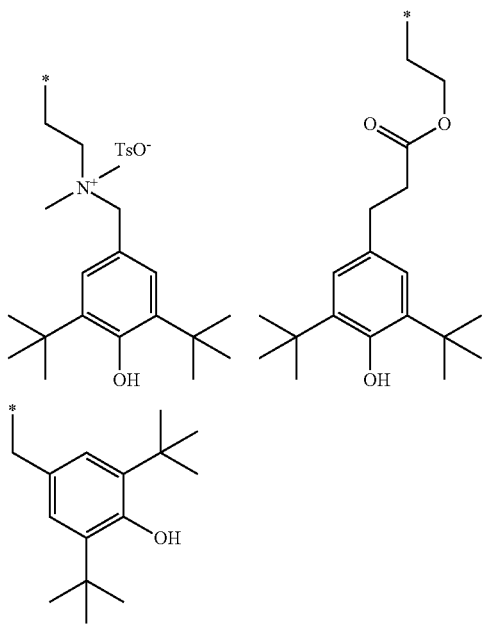

Of the above, the structural unit represented by General Formula 1 is preferably at least one structural unit selected from the group consisting of General Formulae 2 to 4 below.

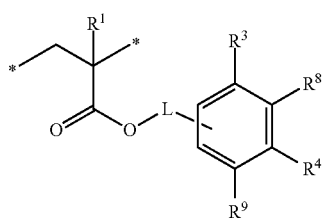
General Formula 2

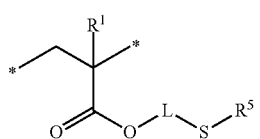
General Formula 3

-continued

General Formula 4

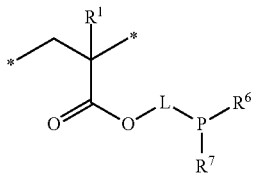

In General Formulae 2 to 4, $R^1$ represents a hydrogen atom or a methyl group.

In General Formulae 2 to 4, L represents a single bond or a divalent linking group.

Examples of the divalent linking group in L include, but are not particularly limited to, an alkylene group having 1 to 3 carbon atoms, an aralkylene group having an alkyl moiety having 1 to 3 carbon atoms, and groups represented by any one of Formulae (L-11) to (L-16) below.

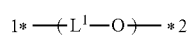
(L-11)

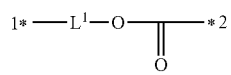
(L-12)

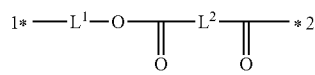
(L-13)

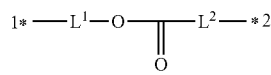
(L-14)

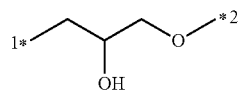
(L-15)

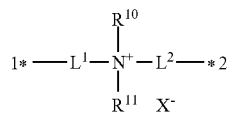
(L-16)

In Formula (L-11), $L^1$ represents an alkylene group having 1 to 3 carbon atoms (for example, a methylene group, an ethylene group, or a propylene group) or an aralkylene group having an alkyl moiety having 1 to 3 carbon atoms (for example, —$C_6H_2(CH_3)(C(CH_3)_3)C_3H_6$—), n represents an integer of 1 to 4, *1 represents a site bonded to a —COO— group, and *2 represents a site bonded to a carbon atom, a sulfur atom, or a phosphorus atom.

In Formula (L-11), n is preferably an integer of 1 to 3, more preferably 1 or 2, and particularly preferably 1.

In Formula (L-12), $L^1$ represents an alkylene group having 1 to 3 carbon atoms (for example, a methylene group, an ethylene group, or a propylene group) or an aralkylene group having an alkyl moiety having 1 to 3 carbon atoms, *1 represents a site bonded to a —COO— group, and *2 represents a site bonded to a carbon atom, a sulfur atom, or a phosphorus atom.

In Formulae (L-13) and (L-14), $L^1$ and $L^2$ each independently represent an alkylene group having 1 to 3 carbon atoms (for example, a methylene group, an ethylene group, or a propylene group) or an aralkylene group having an alkyl moiety having 1 to 3 carbon atoms, *1 represents a site bonded to a —COO— group, and *2 represents a site bonded to a carbon atom, a sulfur atom, or a phosphorus atom.

In Formula (L-15), *1 represents a site bonded to a —COO— group, and *2 represents a site bonded to a carbon atom, a sulfur atom, or a phosphorus atom.

In Formula (L-16), $R^{10}$ and $R^{11}$ each represent a hydrogen atom or a hydrocarbon group. The hydrocarbon group in $R^{10}$ and $R^{11}$ is preferably an alkyl group having 1 to 3 carbon atoms and more preferably a methyl group. $X^-$ represents a counter anion. $X^-$ is preferably a halide ion, a perchloric acid ion, a tetrafluoroborate ion, a hexafluorophosphate ion, and a sulfonic acid ion and more preferably a perchloric acid ion, a hexafluorophosphate ion, and an aryl sulfonic acid ion. $L^1$ and $L^2$ each independently represent an alkylene group having 1 to 3 carbon atoms (for example, a methylene group, an ethylene group, or a propylene group) or an aralkylene group having an alkyl moiety having 1 to 3 carbon atoms. *1 represents a site bonded to a —COO— group, and *2 represents a site bonded to a carbon atom, a sulfur atom, or a phosphorus atom.

In General Formulae 2 and 3, $R^3$, $R^4$, and $R^5$ each independently represent a linear, branched, alicyclic, or aromatic hydrocarbon group having 1 to 18 carbon atoms.

$R^3$ and $R^4$ are each independently preferably a branched hydrocarbon group having 1 to 5 carbon atoms. Preferred examples thereof include an isopropyl group, an isobutyl group, a sec-butyl group, a tert-butyl group, an isoamyl group, a sec-amyl group, and a tert-amyl group. A tert-butyl group or a tert-amyl group is more preferred.

$R^5$ is preferably a linear hydrocarbon group having 8 to 18 carbon atoms and more preferably a linear hydrocarbon group having 12 to 18 carbon atoms.

In General Formula 4, $R^6$ and $R^7$ each independently represent a linear, branched, alicyclic, or aromatic hydrocarbon group that has 1 to 18 carbon atoms and that may have a substituent. $R^6$ and $R^7$ may be bonded to each other to form a ring structure.

$R^6$ and $R^7$ are each independently preferably a group including an aromatic hydrocarbon and more preferably a phenyl group or a phenyloxy group.

In General Formula 2, one of $R^8$ or $R^9$ represents a hydroxy group, and the other represents a hydrogen atom.

Specific examples of the structural unit represented by any of General Formulae 2 to 4 include structural units AO-1 to AO-8 blow.

AO-1

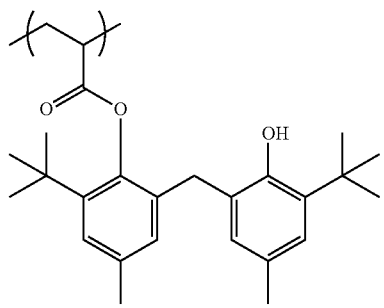

AO-2
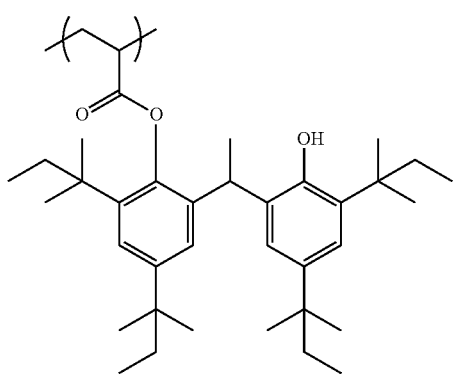
AO-3
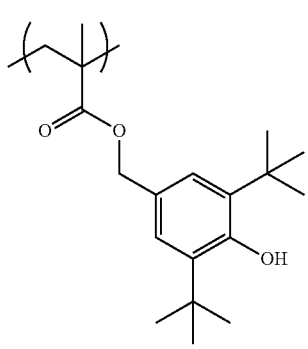
AO-4
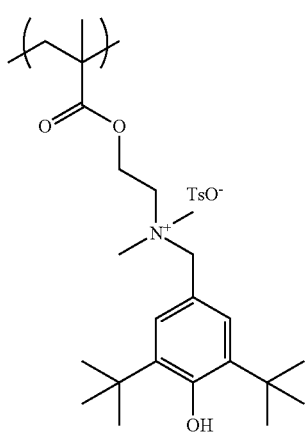
AO-5
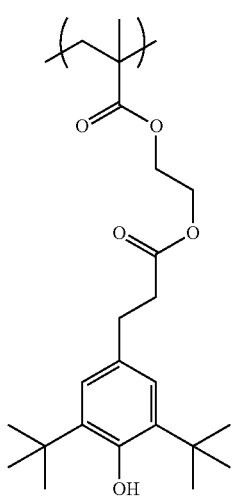
AO-6
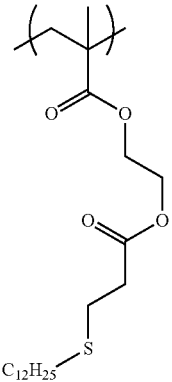
AO-7
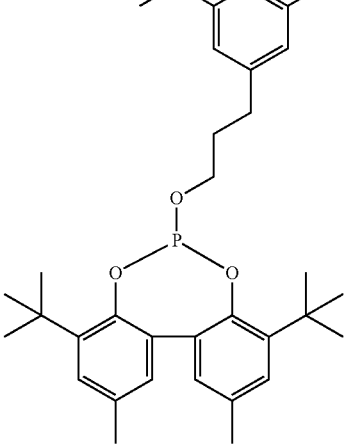
AO-8
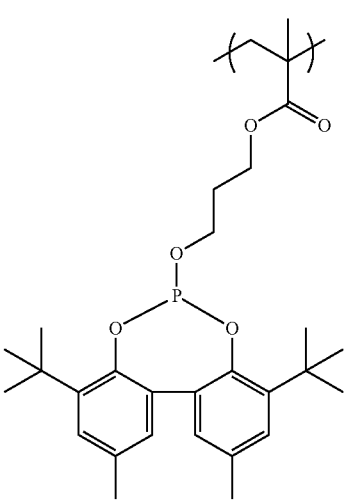
A ratio of the structural unit represented by General Formula 1 is preferably 10% by mass or more with respect to a total mass of all structural units in the polymer.
When the ratio of the structural unit represented by General Formula 1 in the polymer is 10% by mass or more, hardness after curing, blocking resistance, and adhesion to a substrate further improve. The upper limit of the ratio of the structural unit represented by General Formula 1 in the polymer is not limited, and may be 100% by mass.

For the same reason as that described above, the ratio of the structural unit represented by General Formula 1 in the polymer is more preferably from 10% by mass to 90% by mass, and still more preferably from 30% by mass to 70% by mass, and still more preferably from 30% by mass 50% by mass. When the ratio of the structural unit represented by General Formula 1 in the polymer is 90% by mass or less, storage stability of the ink and ejection stability during ejection by an ink jet method further improve.

The polymer in the present disclosure preferably has, as a structural unit B different from the structural unit A, at least one selected from the group consisting of a structural unit having an amide structure (hereinafter also referred to as a "structural unit b1" as required) and a structural unit having a cyclic hydrocarbon group (hereinafter also referred to as a "structural unit b2" as required).

When the polymer in the present disclosure includes at least one of the structural unit b1 having an amide structure or the structural unit b2 having a cyclic hydrocarbon group, the adhesion between an image and a substrate further improves.

Each of the structural unit b1 and the structural unit b2 in the polymer may include only one structural unit or two or more structural units.

Structural Unit b1 Having Amide Structure

When the polymer includes the structural unit b1, an amide structure in the structural unit b1 contributes to an improvement in adhesion between an image and a substrate.

From the viewpoint of further improving adhesion between an image and a substrate, the structural unit b1 is preferably at least one of a structural unit (b1-1) below or a structural unit (b1-2) below.

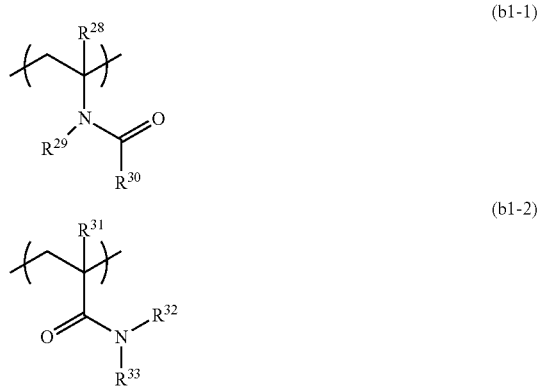

First, the structural unit (b1-1) will be described.

In the structural unit (b1-1), $R^{28}$ represents a hydrogen atom or a hydrocarbon group, and $R^{29}$ and $R^{30}$ each independently represent a hydrogen atom or a hydrocarbon group that may include an oxygen atom. $R^{29}$ and $R^{30}$ may be bonded to each other to form a ring.

In the structural unit (b1-1), $R^{28}$ is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

In $R^{29}$ and $R^{30}$, the number of carbon atoms of the hydrocarbon group is preferably from 1 to 6 and more preferably from 1 to 3. The hydrocarbon groups in $R^{29}$ and $R^{30}$ are each preferably an alkyl group. Examples of the alkyl group include a methyl group, an ethyl group, a propyl group, a butyl group, and a hexyl group. Of these, an alkyl group having 1 to 6 carbon atoms is more preferred, and an alkyl group having 1 to 3 carbon atoms is still more preferred.

From the viewpoint of hardness of the resulting film, in the structural unit (b1-1), $R^{29}$ and $R^{30}$ are each independently preferably a hydrocarbon group, or $R^{29}$ and $R^{30}$ are preferably bonded to each other to form (that is, $R^{29}$ and $R^{30}$ preferably together form) a ring.

When $R^{29}$ and $R^{30}$ are bonded to each other to form a ring, the group formed by $R^{29}$ and $R^{30}$ together is particular preferably a group represented by Formula (N31) or Formula (N32).

In Formula (N31) or Formula (N32), *1 represents a site bonded to a nitrogen atom, and *2 represents a site bonded to a carbon atom.

Preferred embodiments of the structural unit (b1-1) are embodiments in which $R^{28}$ represents a hydrogen atom or an alkyl group having 1 to 3 carbon atoms (preferably a hydrogen atom), and $R^{29}$ and $R^{30}$ each independently represent a hydrogen atom or an alkyl group having 1 to 6 carbon atoms or $R^{29}$ and $R^{30}$ are bonded to each other to represent (that is, $R^{29}$ and $R^{30}$ together represent) a group represented by Formula (N31) or Formula (N32).

From the viewpoint of hardness of the resulting film, among these embodiments, more preferred embodiments are embodiments in which $R^{29}$ and $R^{30}$ each independently represent an alkyl group having 1 to 6 carbon atoms or $R^{29}$ and $R^{30}$ are bonded to each other to represent a group represented by Formula (N31) or Formula (N32).

Next, the structural unit (b1-2) will be described.

In the structural unit (b1-2), $R^{31}$ represents a hydrogen atom or a hydrocarbon group, and $R^{32}$ and $R^{33}$ each independently represent a hydrogen atom or a hydrocarbon group that may include an oxygen atom. $R^{32}$ and $R^{33}$ may be bonded to each other to form a ring.

$R^{31}$ is preferably a hydrogen atom or an alkyl group having 1 to 3 carbon atoms, more preferably a hydrogen atom, a methyl group, or an ethyl group, still more preferably a hydrogen atom or a methyl group, and particularly preferably a hydrogen atom.

In $R^{32}$ and $R^{33}$, the number of carbon atoms of the hydrocarbon group that may include an oxygen atom is preferably from 1 to 6 and more preferably from 1 to 3.

Examples of the "hydrocarbon group that may include an oxygen atom" in $R^{32}$ and $R^{33}$ include hydrocarbon groups substituted with alkoxy groups, hydrocarbon groups substituted with acyl groups, hydrocarbon groups substituted with acyloxy groups, hydrocarbon groups substituted with alkoxycarbonyl groups, hydrocarbon groups substituted with a hydroxy group, and hydrocarbon groups substituted with a carboxyl group.

From the viewpoint of hardness of the resulting film, in the structural unit (b1-2), $R^{32}$ and $R^{33}$ preferably each independently represent a hydrocarbon group that may include an oxygen atom, or $R^{32}$ and $R^{33}$ are preferably bonded to each other to form (that is, $R^{32}$ and $R^{33}$ preferably together form) a ring.

When $R^{32}$ and $R^{33}$ are bonded to each other to form a ring, $R^{32}$ and $R^{33}$ are preferably a group represented by any one of Formula (N33) to Formula (N36) below.

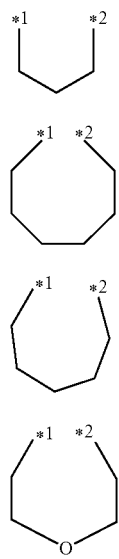

(N33)

(N34)

(N35)

(N36)

In Formula (N33) to Formula (N36), *1 and *2 each represent a site bonded to a nitrogen atom.

Particularly preferred embodiments of the structural unit (b1-2) are embodiments in which $R^{31}$ represents a hydrogen atom or an alkyl group having 1 to 3 carbon atoms, and $R^{32}$ and $R^{33}$ each independently represent a hydrogen atom or an alkyl group having 1 to 3 carbon atoms or $R^{32}$ and $R^{33}$ are bonded to each other to represent a group represented by any one of Formula (N33) to Formula (N36).

Among the above embodiments, from the viewpoint of hardness of the resulting film, still more preferred embodiments are those in which $R^{32}$ and $R^{33}$ each independently represent an alkyl group having 1 to 3 carbon atoms, or $R^{32}$ and $R^{33}$ are bonded to each other to represent (that is, $R^{32}$ and $R^{33}$ together represent) a group represented by any one of Formula (N33) to Formula (N36).

Specific examples (3-1) to (3-17) of the structural unit b1 are shown below. However, the structural unit b1 is not limited to the following specific examples.

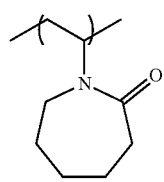

(3-1)

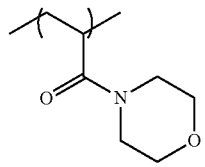

(3-2)

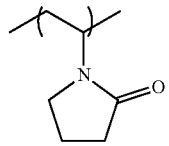

(3-3)

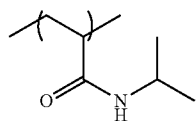

(3-4)

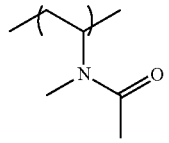

(3-5)

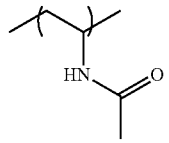

(3-6)

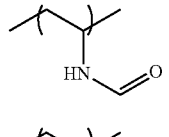

(3-7)

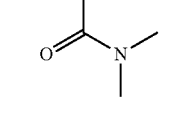

(3-8)

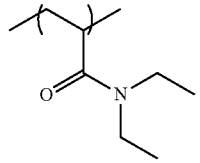

(3-9)

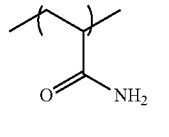

(3-10)

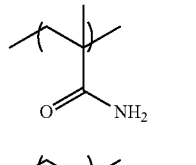

(3-11)

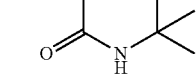

(3-12)

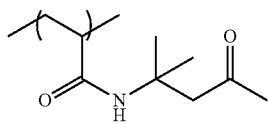
(3-13)

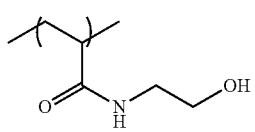
(3-14)

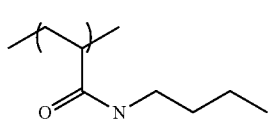
(3-15)

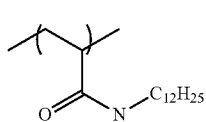
(3-16)

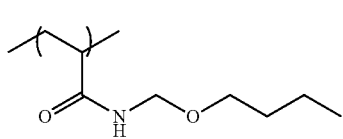
(3-17)

Structural Unit b2 Having Cyclic Hydrocarbon Group

The structural unit b2 has a hydrocarbon group including a ring structure that may include an oxygen atom.

When the polymer includes the structural unit b2, the hydrocarbon group including a ring structure that may include an oxygen atom in the structural unit b2 contributes to an improvement in adhesion between an image and a substrate.

Examples of the hydrocarbon group including a ring structure that may include an oxygen atom include substituted or unsubstituted aryl groups, substituted or unsubstituted alicyclic groups, substituted or unsubstituted cyclic acetal groups, substituted or unsubstituted cyclic ether groups, substituted or unsubstituted lactone groups, substituted or unsubstituted heteroaryl groups that include an oxygen atom as a heteroatom.

Examples of the substituents in the substituted aryl groups, the substituted alicyclic groups, the substituted cyclic acetal groups, the substituted cyclic ether groups, the substituted lactone groups, and the substituted heteroaryl groups include alkoxy groups, acyl groups, acyloxy groups, alkoxy carbonyl groups, a hydroxy group, and a carboxyl group.

More specifically, examples of the hydrocarbon group including a ring structure that may include an oxygen atom include a phenyl group, a naphthyl group, a biphenyl group, a cyclohexyl group, alkylcyclohexyl groups, a norbornyl group, an isobornyl group, a dicyclopentanyl group, a dicyclopentenyl group, an adamantyl group, a furfuryl group, a hydrofurfuryl group, cyclic acetal groups, cyclic ether groups, and lactone groups.

The number of carbon atoms of the hydrocarbon group including a ring structure that may include an oxygen atom is preferably from 3 to 20, more preferably from 6 to 20, still more preferably from 6 to 12, and particularly preferably from 6 to 10.

In the hydrocarbon group including a ring structure that may include an oxygen atom, the ring structure may be a monocyclic structure or a polycyclic structure.

The hydrocarbon group including a ring structure in the structural unit b2 is preferably a hydrocarbon group including a polycyclic structure from the viewpoint of further improving adhesion between an image and a substrate.

The hydrocarbon group including a polycyclic structure is more preferably an alicyclic group having a polycyclic structure and more preferably a norbornyl group, an isobornyl group, a dicyclopentanyl group, a dicyclopentenyl group, or an adamantyl group.

The structural unit b2 is preferably a structural unit (b2-1) below from the viewpoint of further improving adhesion between an image and a substrate.

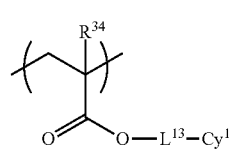
(b2-1)

In the structural unit (b2-1), $R^{34}$ represents a hydrogen atom or a hydrocarbon group, $L^{13}$ represents a single bond or a divalent organic group, and $Cy^1$ represents a hydrocarbon group including a polycyclic structure that may include an oxygen atom.

In the structural unit (b2-1), preferred embodiments of the hydrocarbon group including a polycyclic structure that may include an oxygen atom and represented by $Cy^1$ are those as described above.

In the structural unit (b2-1), $R^{34}$ is preferably a hydrogen atom or an alkyl group having 1 to 3 carbon atoms, more preferably a hydrogen atom, a methyl group, or an ethyl group, still more preferably a hydrogen atom or a methyl group, and particularly preferably a methyl group.

In the structural unit (b2-1), $L^{13}$ has the same definition as in L in General Formulae 2 to 4.

Specific examples (4-1) to (4-21) of the structural unit b2 are shown below. However, the structural unit b2 is not limited to the following specific examples.

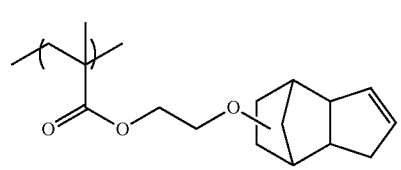
(4-1)

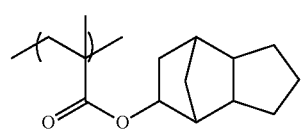
(4-2)

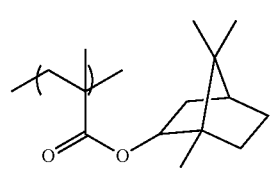
(4-3)

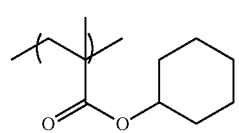
(4-4)

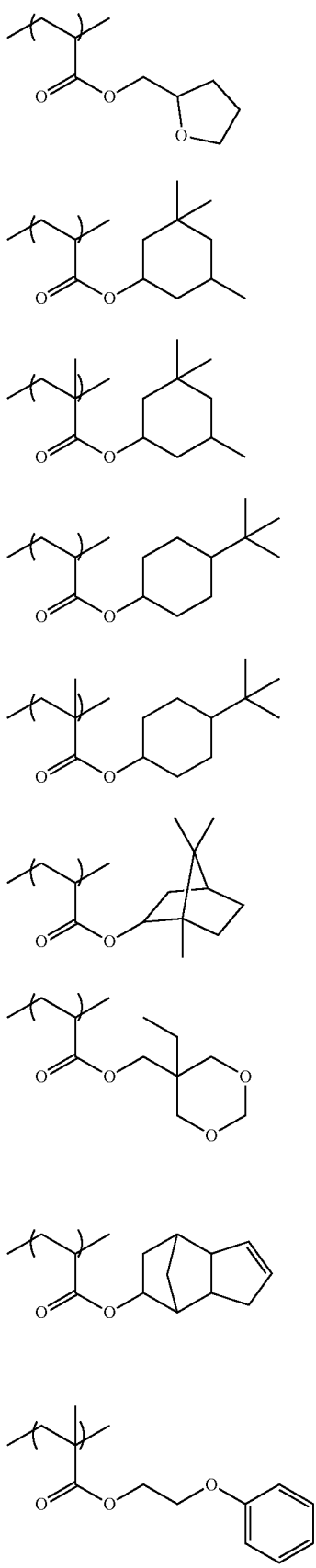
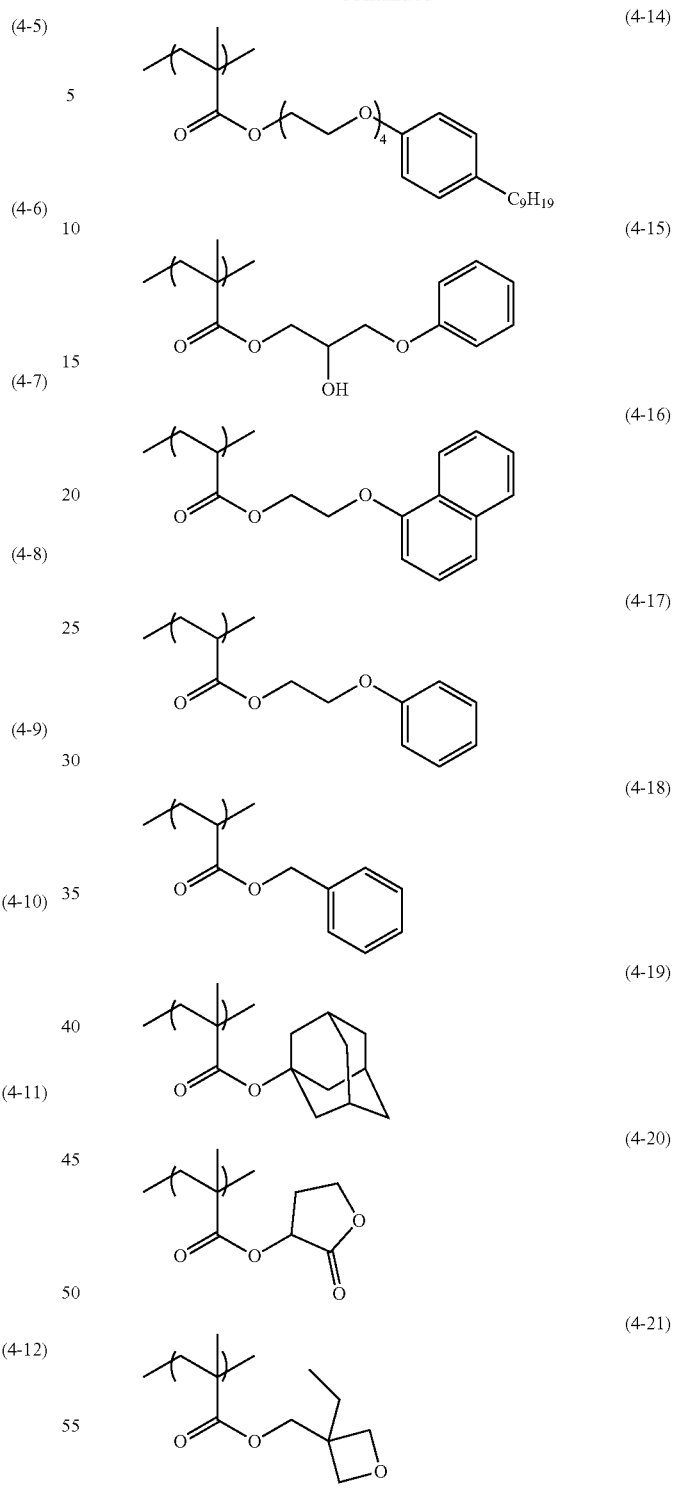

When the polymer includes at least one of the structural unit b1 or the structural unit b2, a total content of the structural unit b1 and the structural unit b2 relative to all structural units in the polymer is preferably 20% by mass or more, more preferably 30% by mass or more, and particularly preferably 50% by mass or more from the viewpoint of further improving adhesion between an image and a substrate.

The upper limit of the total content of the structural unit b1 and the structural unit b2 relative to all the structural units in the polymer is preferably 70% by mass or less, more preferably 60% by mass or less, and particularly preferably 50% by mass or less, although the upper limit depends on the content of the structural unit A.

Other Structural Units

The polymer may include a structural unit other than the structural unit A and the structural unit B described above.

For example, the polymer can optionally include a structural unit derived from a vinyl monomer as the other structural unit.

The polymer may include a structural unit having an aminoalkyl group as the other structural unit within a range that does not impair storage stability of the ink.

However, from the viewpoint of storage stability of the ink, the content of the structural unit having an aminoalkyl group serving as the other structural unit is preferably 10% by mass or less, more preferably 3% by mass or less, and still more preferably 1% by mass or less with respect to the total amount of the polymer. From the viewpoint of storage stability of the ink, a particularly preferred embodiment is an embodiment in which the polymer does not include a structural unit having an aminoalkyl group serving as the other structural unit.

The polymer in the present disclosure preferably has a weight-average molecular weight in a range of from 1,000 to 50,000. When the polymer has a weight-average molecular weight of 1,000 more, an image strength further improves, and good blocking resistance is obtained. When the polymer has a weight-average molecular weight of 50,000 or less, storage stability of the ink and ejection stability during election by an ink jet method further improve.

The weight-average molecular weight of the polymer is more preferably from 3,000 to 40,000, still more preferably from 5,000 to 40,000, still more preferably from 5,000 to 30,000, and particularly preferably from 10,000 to 30,000.

In the present specification, the "weight-average molecular weight (Mw)" is a value measured by gel permeation chromatography (GPC).

In the measurement by gel permeation chromatography (GPC), HLC (registered trademark)-8020GPC (Tosoh Corporation) is used as a measurement apparatus, three TSKgel (registered trademark) Super Multipore HZ-H columns (4.6 mm ID×15 cm, Tosoh Corporation) are used as columns, and THF (tetrahydrofuran) is used as an eluant. Regarding measurement conditions, the measurement is conducted at a sample concentration of 0.45% by mass, at a flow rate of 0.35 mL/min, with an amount of sample injected of 10 μL, and at a measurement temperature of 40° C. by using a refractive index (RI) detector.

A calibration curve is prepared from eight samples of "Standard sample TSK standard, polystyrene" manufactured by Tosoh Corporation: "F-40", "F-20", "F-4", "F-1", "A-5000", "A-2500", and "A-1000" and "n-propylbenzene".

The content of the polymer in the photo-curable ink composition is preferably from 0.5% by mass to 10.0% by mass with respect to the total mass of the photo-curable ink composition. When the content of the polymer with respect to the total mass of the ink composition is 0.5% by mass or more, the image strength further improves, and good blocking resistance is obtained. When the content of the polymer is 10.0% by mass or less, storage stability of the ink and ejection stability during ejection by an ink jet method further improve.

The content of the polymer is more preferably from 2.0% by mass to 9.0% by mass and particularly preferably from 2.0% by mass to 7.0% by mass with respect to the total mass of the ink composition.

Radical-Polymerizable Monomer

The photo-curable ink composition of the present disclosure contains at least one radical-polymerizable monomer.

As the radical-polymerizable monomer, the photo-curable ink composition of the present disclosure at least includes at least one of a monofunctional radical-polymerizable monomer or a bifunctional radical-polymerizable monomer and can further contain a tri- or higher functional radical-polymerizable monomer.

An embodiment of the ink composition of the present disclosure may be an embodiment in which both at least one monofunctional radical-polymerizable monomer and at least one bifunctional radical-polymerizable monomer are contained, an embodiment in which at least one monofunctional radical-polymerizable monomer is contained and no bifunctional radical-polymerizable monomer is contained, or an embodiment in which at least one bifunctional radical-polymerizable monomer is contained and no monofunctional radical-polymerizable monomer is contained.

In the photo-curable ink composition of the present disclosure, a total content of the monofunctional radical-polymerizable monomer and the bifunctional radical-polymerizable monomer (hereinafter, these may be generically referred to as "specific radical-polymerizable monomer") in a total content of the radical-polymerizable monomer is in a range of 50% by mass or more with respect to the total mass of the photo-curable ink composition.

A total content of the specific radical-polymerizable monomer of 50% by mass or more means that the ink composition of the present disclosure is an ink containing the specific radical-polymerizable monomer as a main liquid component.

The specific radical-polymerizable monomer has a function of imparting photo-curability (that is, a property of being cured by light) to the ink and a function of maintaining the liquid state of the ink.

The content of the specific radical-polymerizable monomer with respect to the total amount of the ink composition of the present disclosure is 50% by mass or more as described above. However, the content of the specific radical-polymerizable monomer is preferably 60% by mass or more and more preferably 65% by mass or more.

The upper limit of the content of the specific radical-polymerizable monomer is not particularly limited. The upper limit may be, for example, 95% by mass or 90% by mass.

Examples of the monofunctional radical-polymerizable monomers include N-vinyl compounds such as N-vinylcaprolactam and N-vinylpyrrolidone; monofunctional acrylate compounds such as 2-phenoxyethyl acrylate (PEA), benzyl acrylate, cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethylcyclohexyl acrylate (TMCHA), dicyclopentenyl acrylate (DCPA), 4-tert-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxypolyethylene glycol acrylate, and nonylphenoxypolypropylene glycol acrylate; monofunctional methacrylate compounds such as 2-phenoxyethyl methacrylate, benzyl methacrylate, isobornyl methacrylate (IBOMA), tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethylcyclohexyl methacrylate (TMCHMA), dicyclopentenyl methacrylate (DCPMA), 4-tert-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxypolyethylene glycol methacrylate, and nonylphenoxypolypropylene glycol methacrylate; monofunctional vinyl ether compounds such as n-propyl vinyl ether, isopropyl vinyl ether, n-butyl vinyl ether, isobutyl vinyl ether, 2-ethylhexyl vinyl ether, cyclohexyl vinyl ether, 2-hydroxyethyl vinyl ether, 4-hydroxybutyl vinyl ether, and cyclohexane dimethanol monovinyl ether; monofunctional acrylamide compounds such as acrylamide, N,N-dimethylacrylamide, N,N-diethylacrylamide, acryloylmorpholine, N-isopropylacrylamide, N-hydroxyethylacrylamide, N-butylacrylamide, N-tert-butylacrylamide, N-(1,1-dimethyl-3-oxobutyl)acrylamide, N-dodecylacrylamide, and N-(butoxymethyl)acrylamide; and monofunctional methacrylamide compounds such as methacrylamide, N-phenylmethacrylamide, N-(methoxymethyl)methacrylamide, N,N-dimethylmethacryl amide, and N-tert-butylmethacrylamide.

Examples of the bifunctional radical-polymerizable monomers include bifunctional acrylate compounds such as hexanediol diacrylate (HDDA), dipropylene glycol diacrylate (DPGDA), polyethylene glycol diacrylate, polypropylene glycol diacrylate, nonanediol diacrylate, decanediol diacrylate, neopentyl glycol diacrylate, polyethylene glycol-modified bisphenol A diacrylate, dioxane glycol diacrylate, cyclohexane dimethanol diacrylate, and tricyclodecane dimethanol diacrylate; 2-(2-vinyloxyethoxy)ethyl acrylate (VEEA); bifunctional vinyl compounds such as 1,4-butanediol divinyl ether, cyclohexanedimethanol divinyl ether, diethylene glycol divinyl ether, and triethylene glycol divinyl ether (DVE3); and bifunctional methacrylate compounds such as hexanediol dimethacrylate, dipropylene glycol dimethacrylate (DPGDMA), polyethylene glycol dimethacrylate, polypropylene glycol dimethacrylate, neopentyl glycol dimethacrylate, and polyethylene glycol-modified bisphenol A dimethacrylate.

Besides the monofunctional radical-polymerizable monomers and the bifunctional radical-polymerizable monomers mentioned above, monofunctional or bifunctional radical-polymerizable monomers that are commercially available or known in the art and that are described in, for example, "Crosslinking Agent Handbook", (1981, Taiseisha Ltd.) edited by Shinzo Yamashita; "UV/EB Curing Handbook (Raw Material Edition)" (1985, Kobunshi Kankokai) edited by Kiyoshi Kato; "Application and Market of UV/EB Curing Technology", p. 79, (1989, CMC Publishing Co., Ltd.) edited by RadTech Japan; and "Polyester Resin Handbook", (1988, Nikkan Kogyo Shimbun, Ltd.) written by Eiichiro Takiyama can also be used as the specific radical-polymerizable monomer.

The weight-average molecular weight of the specific radical-polymerizable monomer is preferably 100 or more and less than 1,000, more preferably 100 or more and 800 or less, and still more preferably 150 or more and 700 or less.

The weight-average molecular weight of the specific radical-polymerizable monomer is a value measured by gel permeation chromatography (GPC).

As described above, the total content of the specific radical-polymerizable monomer with respect to the total amount of the ink composition of the present disclosure is 50% by mass or more.

The ink composition of the present disclosure may contain a tri- or higher functional radical-polymerizable monomer as long as this condition is satisfied.

Examples of the tri- or higher functional radical-polymerizable monomer include tri- or higher functional (meth)acrylate compounds such as pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, pentaerythritol trimethacrylate, and pentaerythritol tetramethacrylate.

The specific radical-polymerizable monomer preferably accounts for 60% by mass or more and preferably 80% by mass or more of the total amount of the radical-polymerizable monomer contained in the ink composition of the present disclosure.

A ratio of the content of the polymer with respect to the total content of the radical-polymerizable monomer is preferably in a range of from 3% by mass to 5% by mass. When the content of the polymer is 3% by mass or more, blocking of a cured portion is suppressed to be low, and hardness and adhesion to a substrate further improve. When the content of the polymer is 5% by mass or less, storage stability of the ink and ejection stability during ejection by an ink jet method further improve.

Radical-Polymerizable Resin

The ink composition of the present disclosure may contain a radical-polymerizable resin (hereinafter, also simply referred to as a "polymerizable resin"). In this case, the polymerizable resin contained in the ink may be one resin or two or more resins. When the ink composition of the present disclosure contains a radical-polymerizable resin, the effect achieved by the structural unit A (the effect of suppressing the phenomenon in which radical polymerization is inhibited by oxygen) is exerted not only for radical polymerization of the radical-polymerizable monomer but also for radical polymerization of the radical-polymerizable resin.

Herein, the term "polymerizable resin" refers to a resin having a polymerizable group.

The concept of the polymerizable resin covers oligomers having polymerizable groups and polymers having polymerizable groups.

Example of a resin serving as a base of the polymerizable resin include acrylic resins, urethane resins, polyester resins, polyether resins, polycarbonate resins, epoxy resins, and polybutadiene resins. Of these, resins that have both a hard segment and a soft segment and that are capable of relaxing a stress during curing are preferred from the viewpoint of reducing cure shrinkage. In particular, at least one resin selected from the group consisting of urethane resins, polyester resins, and epoxy resins is more preferred.

The polymerizable group included in the polymerizable resin is preferably a group including an ethylenically double bond and more preferably a group including at least one of a vinyl group or a 1-methylvinyl group.

From the viewpoint of polymerization reactivity and hardness of a film to be formed, the polymerizable group is particularly preferably a (meth)acryloyl group.

These polymerizable groups can be introduced into a resin (a polymer or an oligomer) by a polymer reaction or copolymerization.

A polymerizable group can be introduced into a polymer (or an oligomer) by using, for example, a reaction between a polymer (or an oligomer) having a carboxy group in a side chain and glycidyl methacrylate, or a reaction between a polymer (or an oligomer) having an epoxy group and an ethylenically unsaturated group-containing carboxylic acid such as methacrylic acid. These groups may be used in combination.

The polymerizable resins may be commercially available products on the market.

Examples of the commercially available products of an acrylic resin having a polymerizable group include (ACA) Z200M, (ACA)Z230AA, (ACA)Z251, and (ACA)Z254F (all of which are available from DAICEL-ALLNEX LTD.) and HITALOID 7975D (Hitachi Chemical Company, Ltd.).

Examples of the commercially available products of a urethane resin having a polymerizable group include EBECRYL (registered trademark) 8402, EBECRYL (registered trademark) 8405, EBECRYL (registered trademark) 9270, EBECRYL (registered trademark) 8311, EBECRYL (registered trademark) 8701, KRM8667, and KRM8528 (all of which are available from DAICEL-ALLNEX LTD.); CN964, CN9012, CN968, CN996, CN975, and CN9782 (all of which are available from SARTOMER); UV-6300B, UV-7600B, UV-7605B, UV-7620EA, and UV-7630B (all of which are available from The Nippon Synthetic Chemical Industry Co., Ltd.); U-6HA, U-15HA, U-108A, U-200PA, and UA-4200 (all of which are available from Shin Nakamura Chemical Co., Ltd.); TESRACK 2300, HITALOID 4863, TESRACK 2328, TESRACK 2350, and HITALOID 7902-1 (all of which are available from Hitachi Chemical Company, Ltd.), and 8UA-017, 8UA-239, 8UA-239H, 8UA-140, 8UA-585H, 8UA-347H, and 8UX-015A (all of which are available from Taisei Fine Chemical Co., Ltd.).

Examples of the commercially available products of a polyester resin having a polymerizable group include CN294, CN2254, CN2260, CN2271E, CN2300, CN2301, CN2302, CN2303, and CN2304 (all of which are available from SARTOMER); and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are available from DAICEL-ALLNEX LTD.).

Examples of the commercially available products of a polyether resin having a polymerizable group include BLEMMER (registered trademark) ADE-400A and BLEMMER (registered trademark) ADP-400 (both of which are available from NOF Corporation).

Examples of the commercially available products of a polycarbonate resin having a polymerizable group include polycarbonate diol diacrylate (Ube Industries, Ltd.).

Examples of the commercially available products of an epoxy resin having a polymerizable group include EBECRYL (registered trademark) 3708 (DAICEL-ALLNEX LTD.); CN120, CN120B60, CN120B80, and CN120E50 (all of which are available from SARTOMER); and HITALOID 7851 (Hitachi Chemical Company, Ltd.).

Examples of the commercially available products of a polybutadiene resin having a polymerizable group include CN301, CN303, and CN307 (all of which are available from SARTOMER).

From the viewpoint of combining adhesion and dispersion stability, the weight-average molecular weight of the polymerizable resin is preferably 1,000 or more and 100,000 or less, more preferably 1,000 or more and 40,000 or less, and still more preferably 1,000 or more and 10,000 or less.

The weight-average molecular weight of the polymerizable resin is a value measured by gel permeation chromatography (GPC). The specific measuring method by GPC is the same as that in the case of the polymer described above.

When the ink composition of the present disclosure contains a polymerizable resin, the content of the polymerizable resin is preferably from 0.1% by mass to 10% by mass, more preferably from 0.3% by mass to 5.0% by mass, and particularly preferably from 1.0% by mass to 3.0% by mass with respect to the total amount of the ink.

Photopolymerization Initiator

The ink composition of the present disclosure preferably further contains a photopolymerization initiator to have photo-curability. Known photopolymerization initiators that absorb light (that is, active energy rays) to generate radicals, which are polymerization-initiating species, can be used as the photopolymerization initiators.

Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaaryl biimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above compounds (a) to (m) may be used alone or in combination of two or more thereof.

Preferred examples of the (a) carbonyl compounds, the (b) acylphosphine oxide compounds, and the (e) thio compounds include compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117.

More preferred examples thereof include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonates described in JP1982-30704A (JP-S57-30704A), dialkoxy benzophenones described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H01-34242B), U.S. Pat. No. 4,318,791A, and EP0284561A1, p-di(dimethylaminobenzoyl)benzene described in JP1990-211452A (JP-H02-211452A), thio-substituted aromatic ketones described in JP1986-194062A (JP-S61-194062A), acylphosphine sulfides described in JP1990-9597B (JP-H02-9597B), acylphosphines described in JP1990-9596B (JP-H02-9596B), thioxanthones described in JP1988-61950B (JP-S63-61950B), and coumarins described in JP1984-42864B (JP-S59-42864B).

Furthermore, the polymerization initiators described in JP2008-105379A and JP2009-114290A are also preferred.

Among these photopolymerization initiators, the (a) carbonyl compounds or the (b) acylphosphine oxide compounds are more preferred. Specific examples thereof include bis(2,4,6-trimethylbenzoyl)-phenylphosphine oxide (for example, IRGACURE (registered trademark) 819 manufactured by BASF), 2-(dimethylamino)-1-(4-morpholinophenyl)-2-benzyl-1-butanone (for example, IRGACURE (registered trademark) 369 manufactured by BASF), 2-methyl-1-(4-methylthiophenyl)-2-morpholinopropan-1-one (for example, IRGACURE (registered trademark) 907 manufactured by BASF), 1-hydroxy-cyclohexyl-phenyl-ketone (for example, IRGACURE (registered trademark) 184 manufactured by BASF), and 2,4,6-trimethylbenzoyl-diphenyl-phosphine oxide (for example, DAROCUR (registered trademark) TPO and LUCIRIN (registered trademark) TPO (both of which are manufactured by BASF).

Of these, from the viewpoint of, for example, improvement of sensitivity and suitability to LED light, the photopolymerization initiator is preferably an (b) acylphosphine oxide compound and more preferably a monoacylphosphine oxide compound (particularly preferably, 2,4,6-trimethylbenzoyl-diphenyl-phosphine oxide) or a bisacylphosphine oxide compound (particularly preferably, bis(2,4,6-trimethylbenzoyl)-phenylphosphine oxide).

The ink composition may contain one photopolymerization initiator or two or more photopolymerization initiators.

When the ink composition of the present disclosure contains a photopolymerization initiator, the content of the photopolymerization initiator is preferably from 1.0% by mass to 25.0% by mass, more preferably from 2.0% by mass to 20.0% by mass, and still more preferably from 3.0% by mass to 15.0% by mass with respect to the total amount of the ink.

Other Components

The photo-curable ink composition of the present disclosure can optionally further contain a component other than the components described above.

Sensitizer

The ink composition of the present disclosure may contain a sensitizer as an auxiliary component.

The sensitizer is a substance that absorbs specific active energy rays to be in an electronically excited state. The sensitizer in the electronically excited state comes in contact with the photopolymerization initiator to cause actions such as electron transfer, energy transfer, and generation of heat. This accelerates a chemical change in the photopolymerization initiator, that is, decomposition, generation of a radical, an acid, or a base, and the like.

Examples of the sensitizer include benzophenone (BP), thioxanthone, isopropylthioxanthone (ITX), ethyl 4-(dimethylamino) benzoate (EDB), anthraquinone, 3-acylcoumarin derivatives, terphenyl, styryl ketone, 3-(aroylmethylene)thiazoline, camphorquinone, eosin, rhodamine, and erythrosine.

In addition, the compound represented by General Formula (i) described in JP2010-24276A and the compound represented by General Formula (I) described in JP1994-107718A (JP-H06-107718A) can also be suitably used as the sensitizer.

From the viewpoint of suitability to light emitting diode (LED) light and reactivity with photopolymerization initiators, among the above compounds, at least one selected from the group consisting of thioxanthone, isopropylthioxanthone, ethyl 4-(dimethylamino) benzoate, and benzophenone is preferred as the sensitizer.

The ink composition may contain one sensitizer or two or more sensitizers.

When the ink composition of the present disclosure contains a sensitizer, the content of the sensitizer is preferably from 0.5% by mass to 10% by mass, more preferably from 1.0% by mass to 7.0% by mass, and particularly preferably from 2.0% by mass to 6.0% by mass. Surfactant The ink composition of the present disclosure may contain a surfactant.

Examples of the surfactant include surfactants described in JP1987-173463A (JP-S62-173463A) and JP1987-183457A (JP-S62-183457A). Examples of the surfactant include anionic surfactants such as dialkyl sulfosuccinates, alkylnaphthalene sulfonates, and fatty acid salts; nonionic surfactants such as polyoxyethylene alkyl ethers, polyoxyethylene alkyl allyl ethers, acetylene glycol, polyoxyethylene-polyoxypropylene block copolymers, and siloxanes such as modified polydimethylsiloxane; cationic surfactants such as alkylamine salts and quaternary ammonium salts; and betaine surfactants such as carbobetaine and sulfobetaine.

Organofluorine compounds having no polymerizable groups may be used instead of the surfactants. The organofluorine compounds are preferably hydrophobic. The organofluorine compounds cover, for example, fluorine-containing surfactants, oily fluorine-containing compounds (e.g., fluorine oil), and solid fluorine compound resins (e.g., a tetrafluoroethylene resin). Examples thereof include the compounds described in JP1982-9053B (JP-S57-9053B) (the 8th column to the 17th column) and JP1987-135826A (JP-S62-135826A).

When the ink composition of the present disclosure contains a surfactant, the content of the surfactant is preferably from 0.01% by mass to 5.0% by mass, more preferably from 0.1% by mass to 3.0% by mass, and particularly preferably from 0.3% by mass to 2.0% by mass with respect to the total amount of the ink composition.

Polymerization Inhibitor

The ink composition of the present disclosure may contain a polymerization inhibitor.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkyl bisphenols, zinc dim ethyldithiocarbamate, copper dim ethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine)aluminum salt.

Of these, at least one selected from the group consisting of p-methoxyphenol, catechols, quinones, alkylphenols, TEMPO, TEMPOL, cupferron Al, and tris(N-nitroso-N-phenylhydroxylamine)aluminum salt is preferred, and at least one selected from the group consisting of p-methoxyphenol, hydroquinone, benzoquinone, BHT, TEMPO, TEMPOL, cupferron Al, and tris(N-nitroso-N-phenylhydroxylamine)aluminum salt is more preferred.

When the ink composition of the present disclosure contains a polymerization inhibitor, the content of the polymerization inhibitor is preferably from 0.01% by mass to 2.0% by mass, more preferably from 0.02% by mass to 1.0% by mass, and particularly preferably from 0.03% by mass to 0.5% by mass with respect to the total amount of the ink composition.

Solvent

The ink composition of the present disclosure may contain a solvent.

Examples of the solvent include ketones such as acetone, methyl ethyl ketone, and diethyl ketone; alcohols such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

When the ink composition of the present disclosure contains a solvent, from the viewpoint of further reducing the effect on a substrate, the content of the solvent is preferably 5% by mass or less, more preferably from 0.01% by mass to 5% by mass, and particularly preferably from 0.01% by mass to 3% by mass with respect to the total amount of the ink composition.

Water

The ink composition of the present disclosure may contain a small amount of water.

The ink composition of the present disclosure is preferably a non-aqueous ink, which contains substantially no water.

Specifically, the content of water is preferably 3% by mass or less, more preferably 2% by mass or less, and particularly preferably 1% by mass or less with respect to the total amount of the ink composition of the present disclosure.

Colorant

The ink composition of the present disclosure may contain at least one colorant.

The colorant is not particularly limited and can be freely selected from known colorants such as pigments, water-soluble dyes, and disperse dyes and used. Of these colorants, pigments are more preferably contained from the viewpoint of good weather resistance and high color reproducibility.

The pigments are not particularly limited and can be appropriately selected according to the purpose. Examples of the pigments include known organic pigments and inorganic pigments. Examples of the pigments further include resin particles dyed with dyestuff, and commercially available pigment dispersions and surface-treated pigments (for example, dispersions obtained by dispersing a pigment in water, a liquid compound, an insoluble resin, or the like serving as a dispersion medium and pigments having surfaces treated with a resin, a pigment derivative, or the like).

Examples of the organic pigments and the inorganic pigments include yellow pigments, red pigments, magenta pigments, blue pigments, cyan pigments, green pigments, orange pigments, violet pigments, brown pigments, black pigments, and white pigments.

In the case where a pigment is used as the colorant, a pigment dispersing agent may be used as required in preparation of pigment particles.

Regarding the colorants, such as pigments, and the pigment dispersing agents, known publications such as paragraphs 0152 to 0158 of JP2011-225848A and paragraphs 0132 to 0149 of JP2009-209352A can be referred to if necessary.

When the ink composition of the present disclosure contains a colorant, the content of the colorant can be, for example, from 0.1% by mass to 20% by mass and is preferably from 0.2% by mass to 10% by mass with respect to the total amount of the ink.

It is also preferable to use the ink composition of the present disclosure as an ink that contains substantially no colorant.

In the present specification, the phrase "contains substantially no colorant" means that the content of the colorant is less than 0.1% by mass with respect to the total amount of the ink composition.

According to an embodiment of the ink that contains substantially no colorant (so-called "clear ink"), it is possible to form a substantially colorless image which has good image strength and in which yellowing is suppressed.

Other Components

The ink composition of the present disclosure may contain components other than the components described above.

Examples of the other components include an ultraviolet absorber, a co-sensitizer, an antioxidant, a color-fading inhibitor, and an electroconductive salt. Regarding the other components, known publications such as JP2011-225848A and JP2009-209352A can be referred to if necessary.

Physical Properties of Ink Composition

Viscosity

The ink composition of the present disclosure preferably has a viscosity of from 10 mPa·s to 50 mPa·s at 25° C., more preferably has a viscosity of from 10 mPa·s to 30 mPa·s at 25° C., and still more preferably has a viscosity of from 10 mPa·s to 25 mPa·s at 25° C. The viscosity of the ink can be adjusted by, for example, adjusting the compositional ratio of components contained in the ink. When the viscosity of the ink is within the above preferred range, ejection stability during ejection by an ink jet method can be further improved.

Herein, the term "viscosity" refers to a viscosity of an ink composition whose temperature is adjusted to 25° C., the viscosity being a value measured by using a viscometer (VISCOMETER RE-85L, manufactured by Toki Sangyo Co., Ltd.).

Surface Tension

The ink composition of the present disclosure preferably has a surface tension of from 20 mN/m to 30 mN/m at 30° C. and more preferably has a surface tension of from 23 mN/m to 28 mN/m at 30° C. When a film is formed on a substrate such as a polyolefin, PET, coated paper, or uncoated paper, the surface tension is preferably 30 mN/m or less from the viewpoint of wettability, and 20 mN/m or more from the viewpoint of permeability and reduction in bleeding.

Herein, the term "surface tension" refers to a surface tension of an ink composition whose temperature is adjusted to 30° C., the surface tension being a value measured by using a surface tensiometer (DY-700, manufactured by Kyowa Interface Science Co., Ltd.).

Method for Forming Image

The photo-curable ink composition of the present disclosure can be suitably used for film formation.

A method for forming an image of the present disclosure includes a step of applying the above-described photo-curable ink composition of the present disclosure to a recording medium (preferably by an ink jet method) (hereinafter also referred to as an "application step") and a step of irradiating the photo-curable ink composition applied to the recording medium with an active energy ray (hereinafter also referred to as an irradiation step).

Since the above-described photo-curable ink composition of the present disclosure is used in the method for forming an image of the present disclosure, an image having good image strength, that is, pencil hardness, good blocking resistance, and good adhesion to a substrate can be formed. Furthermore, the method for forming an image of the present disclosure also has good storage stability of the ink composition and good ejection stability during ejection by an ink jet method.

The method for forming an image of the present disclosure may be an image forming method including applying a photo-curable ink composition to a recording medium which is an example of a substrate by an ink jet method to form an image formed of a film.

Application Step

The application step is a step of applying an ink composition of the present disclosure to a substrate.

Any embodiment using a known method such as a coating method, an immersion method, or an ink jet method may be employed as an embodiment of applying an ink to a substrate. Of these, the ink jet method is suitable from the viewpoint that a film (for example, an image) can be formed on various substrates (including a recording medium).

For example, an embodiment in which a photo-curable ink composition is applied to a desired recording medium serving as a substrate by an ink jet method is particularly preferred.

The substrate is not particularly limited, and, for example, known substrates provided as supports and recording media can be appropriately selected and used.

Examples of the substrate include paper, paper laminated with a plastic (such as polyethylene, polypropylene, or polystyrene), metal sheets (such as sheets made of a metal, e.g., aluminum, zinc, or copper), plastic films (such as films made of polyvinyl chloride (PVC) resins, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinylacetal, an acrylic resin, or the like), paper laminated with any of the metals, paper on which any of the metals is deposited by vapor deposition, plastic films laminated with any of the metals, and plastic films on which any of the metals is deposited by vapor deposition.

The photo-curable ink composition of the present disclosure can form a film having good adhesion to a substrate. Accordingly, the photo-curable ink composition is particularly suitable for applications in which a film is formed on a non-absorbable substrate.

Herein, the term "non-absorbable" refers to a property of a water absorption (% by mass, 24 hours) of less than 0.2 as determined in accordance with ASTM D570 of the ASTM test method.

The non-absorbable substrate is preferably a plastic substrate such as a polyvinyl chloride (PVC) substrate, a polystyrene (PS) substrate, a polycarbonate (PC) substrate, a polyethylene terephthalate (PET) substrate, a polypropylene (PP) substrate, or an acrylic resin substrate.

The application of the ink composition by the ink jet method can be performed by using a known ink jet recording apparatus.

The ink jet recording apparatus is not particularly limited, and a known ink jet recording apparatus capable of achieving a desired resolution can be freely selected and used. Specifically, any known ink jet recording apparatus including a commercially available product can eject the ink composition onto a substrate in the method for forming an image.

An example of the ink jet recording apparatus is an apparatus that includes an ink supply system, a temperature sensor, and heating means.

The ink supply system includes, for example, a source tank including an ink composition, a supply line, an ink supply tank arranged on the immediate upstream of an ink jet head, a filter, and a piezoelectric ink jet head. The piezoelectric ink jet head can be driven so that multi-size dots of preferably from 1 pL to 100 pL and more preferably from 8 pL to 30 pL can be ejected at a resolution of preferably from 320 dpi (dot per inch)×320 dpi to 4,000 dpi×4,000 dpi (dot per inch), more preferably from 400 dpi×400 dpi to 1,600 dpi×1,600 dpi, and still more preferably from 720 dpi×720 dpi to 1,600 dpi×1,600 dpi. The term "dpi" represents the number of dots per 2.54 cm (1 inch).

Irradiation Step

The irradiation step is a step of irradiating the ink composition applied to the substrate with an active energy ray. The irradiation of the ink composition with active energy rays causes polymerization reaction of a specific radical-polymerizable monomer in the ink composition to proceed. As a result, a film (for example, an image) is fixed, and a film hardness (image strength) can be improved.

Examples of the active energy rays that can be used in the irradiation step include ultraviolet rays (UV light), visible rays, and electron beams. Of these, UV light is preferred.

The peak wavelength of the active energy rays is preferably from 200 nm to 405 nm, more preferably from 220 nm to 390 nm, and still more preferably from 220 nm to 385 nm. A peak wavelength of from 200 nm to 310 nm is also preferred, and a peak wavelength of from 200 nm to 280 nm is also preferred.

An exposure surface illuminance during the irradiation with active energy rays is, for example, from 10 mW/cm$^2$ to 2,000 mW/cm$^2$ and preferably from 20 mW/cm$^2$ to 1,000 mW/cm$^2$.

Mercury lamps, metal halide lamps, ultraviolet (UV) fluorescent lamps, gas lasers, solid-state lasers, and the like are widely known as sources for generating the active energy rays.

Replacement of the above light sources mentioned as examples by semiconductor ultraviolet light-emitting devices is very useful from the industrial and environmental standpoints.

Of the semiconductor ultraviolet light-emitting devices, LEDs (light emitting diodes) and LDs (laser diodes) have small sizes, enhanced lives, high efficiencies, and low costs and are expected to be the light sources.

The light sources are preferably metal halide lamps, extra-high-pressure mercury lamps, high-pressure mercury lamps, medium-pressure mercury lamps, low-pressure mercury lamps, LEDs, or blue-violet lasers.

Of these, in the case where a sensitizer and a photopolymerization initiator are used in combination, an extra-high-pressure mercury lamp capable of applying light having a wavelength of 365 nm, 405 nm, or 436 nm, a high-pressure mercury lamp capable of applying light having a wavelength of 365 nm, 405 nm, or 436 nm, or an LED capable of applying light having a wavelength of 355 nm, 365 nm, 385 nm, 395 nm, or 405 nm is more preferred, and an LED capable of applying light having a wavelength of 355 nm, 365 nm, 385 nm, 395 nm, or 405 nm is most preferred.

In the irradiation step, the ink composition applied to the substrate is preferably irradiated with active energy rays for 0.01 seconds to 120 seconds and more preferably 0.1 seconds to 90 seconds.

Regarding irradiation conditions and a basic irradiation method, the irradiation conditions and the irradiation method disclosed in JP1985-132767A (JP-S60-132767A) can be applied in a similar manner.

Specifically, the method for irradiation with active energy rays is preferably a method in which a light source is disposed on both sides of a head unit including a device for ejecting an ink composition, and the head unit and the light sources are scanned by a so-called shuttle method or a method in which irradiation with active energy rays is conducted with a separate light source that is not driven.

The irradiation with the active energy rays is conducted after a certain period of time (for example, 0.01 seconds to 120 seconds and preferably 0.01 seconds to 60 seconds) after the ink composition is landed, heated, and dried.

Heating Drying Step

The method for forming an image of the present disclosure may further optionally include a heating drying step after the application step and before the irradiation step.

Examples of the heating means include, but are not particularly limited to, a heat drum, hot air, an infrared lamp, a hot oven, and heating with a heating plate.

The heating temperature is preferably 40° C. or higher, more preferably about from 40° C. to 150° C., and still more preferably about from 40° C. to 80° C.

The heating time can be appropriately determined in consideration of the composition of the ink composition and the formation speed of a film (image).

The heated ink composition is further optically fixed by being irradiated with active energy rays in the irradiation step, as required. In the irradiation step, the fixing is preferably conducted by using UV light, as described above.

EXAMPLES

The present invention will now be more specifically described with reference to Examples. It is to be understood that the present invention is not limited to the Examples described below within a scope that does not deviate from the gist of the invention. In the description below, the number on the lower right side of each structural unit of a copolymer indicates a copolymerization ratio (% by mole).

Synthesis of Polymer
Synthesis of Polymer (1)

A polymer (1) was synthesized as follows.

The polymer (1) is a polymer (polymer including a structural unit represented by General Formula 1) used in Example 1A described below.

In a 300-mL three-necked flask equipped with a condenser, 84.31 g of methyl propylene glycol (reaction solvent) was weighed and heated at 75° C. under stirring in a nitrogen stream.

A mixed solution separately prepared by mixing 56.21 g of methyl propylene glycol, 59.18 g of SUMILIZER GM (manufactured by Sumitomo Chemical Co., Ltd.), and 1.0362 g of V-601 (dimethyl 2,2'-azobis(2-methylpropionate); polymerization initiator manufactured by FUJIFILM Wako Pure Chemical Corporation) was added dropwise to the flask over a period of two hours. After the completion of the dropwise addition, the resulting mixture was heated at 75° C. for four hours and then further stirred at 90° C. for two hours to react the mixture.

The resulting reaction solution was allowed to cool. The reaction solution after being allowed to cool was poured into 2,000 mL of water, purified by reprecipitation, and then dried under vacuum.

As a result, a polymer (1) (weight-average molecular weight (Mw): 10,000) having the following structure was obtained.

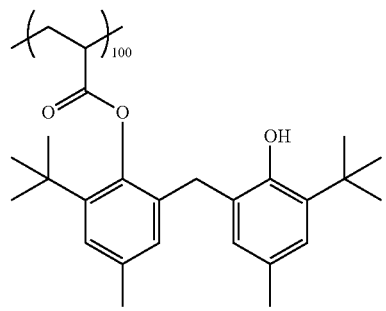

Synthesis of Polymer (8)

A polymer (8) was synthesized as follows.

The polymer (8) is a polymer (polymer including a structural unit represented by General Formula 1) used in Examples 8A and 1B described below.

In a 300-mL three-necked flask equipped with a condenser, 89.35 g of methyl propylene glycol (reaction solvent) was weighed and heated at 75° C. under stirring in a nitrogen stream.

A mixed solution separately prepared by mixing 59.57 g of methyl propylene glycol, 30.89 g of SUMILIZER GM (manufactured by Sumitomo Chemical Co., Ltd.), 30.86 g of N-vinylcaprolactam (raw material monomer), and 2.0723 g of V-601 (dimethyl 2,2'-azobis(2-methylpropionate); initiator manufactured by FUJIFILM Wako Pure Chemical Corporation) was added dropwise to the flask over a period of two hours. After the completion of the dropwise addition, the resulting mixture was heated at 75° C. for four hours and then further stirred at 90° C. for two hours to react the mixture.

The resulting reaction solution was allowed to cool. The reaction solution after being allowed to cool was poured into 2,000 mL of water, purified by reprecipitation, and then dried under vacuum.

As a result, a polymer (8) (weight-average molecular weight (Mw): 10,000) having the following structure was obtained.

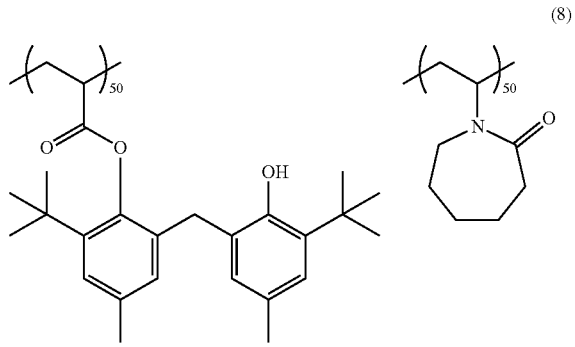

Synthesis of Polymer (19)

A polymer (19) was synthesized as follows.

The polymer (19) is a polymer (polymer including a structural unit represented by General Formula 1) used in Examples 19A and 6B described below.

In a 300-mL three-necked flask equipped with a condenser, 80.28 g of methyl propylene glycol (reaction solvent) was weighed and heated at 75° C. under stirring in a nitrogen stream.

A mixed solution separately prepared by mixing 53.52 g of methyl propylene glycol, 28.41 g of SUMILIZER GM (manufactured by Sumitomo Chemical Co., Ltd.), 10.86 g of N-vinylcaprolactam (raw material monomer), 16.01 g of isobornyl methacrylate (raw material monomer), and 2.0723 g of V-601 (dimethyl 2,2'-azobis(2-methylpropionate); initiator manufactured by FUJIFILM Wako Pure Chemical Corporation) was added dropwise to the flask over a period of two hours. After the completion of the dropwise addition, the resulting mixture was heated at 75° C. for four hours and then further stirred at 90° C. for two hours to react the mixture.

The resulting reaction solution was allowed to cool. The reaction solution after being allowed to cool was poured into 2,000 mL of water, purified by reprecipitation, and then dried under vacuum.

As a result, a polymer (19) (weight-average molecular weight (Mw): 10,000) having the following structure was obtained.

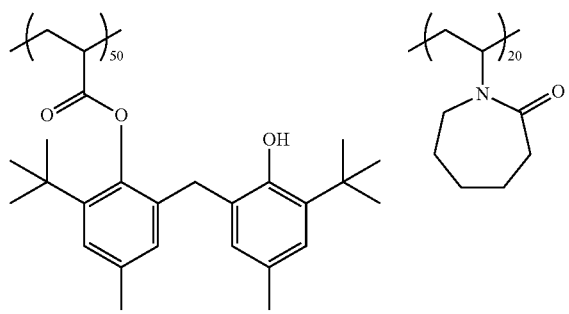

Polymers used in other Examples and Comparative Examples described below were also synthesized as in the polymer (1), (8), or (19) by appropriately selecting the types and the amounts of raw material monomers used.

The weight-average molecular weight (Mw) was adjusted by adjusting the amount of V-601 (initiator).

Example 1A

A photo-curable ink A (monofunctional monomer-based ink) was prepared by mixing components having the composition described below. A ratio of the mass of the polymer with respect to the total mass of radical-polymerizable monomers is 4.3% by mass.

Composition

IBOA below (Monofunctional monomer): 25.0% by mass
CTFA below (Monofunctional monomer): 25.0% by mass
PEA below (Monofunctional monomer): 19.9% by mass
CN964: 2.0% by mass
  (manufactured by SARTOMER; Urethane oligomer having polymerizable group)
IRGACURE 819: 5.0% by mass
  (Photopolymerization initiator manufactured by BASF; Bis(2,4,6-trimethylbenzoyl)-phenylphosphine oxide (Acylphosphine oxide compound))
IRGACURE 184: 3.0% by mass
  (Photopolymerization initiator manufactured by BASF; 1-Hydroxy-cyclohexyl-phenyl-ketone (Carbonyl compound))
ITX (Sensitizer; 2-Isopropylthioxanthone): 1.0% by mass
BP (Sensitizer; Benzophenone): 2.0% by mass
EDB (Sensitizer; Ethyl 4-(dimethylamino) benzoate): 1.0% by mass
FIRSTCURE ST-1: 0.1% by mass
  (Polymerization inhibitor manufactured by Albemarle Corporation)
BYK-UV3575: 1.0% by mass
  (Modified polydimethylsiloxane surfactant manufactured by BYK-Chemie GmbH)
C (cyan) pigment dispersion liquid described below: 12.0% by mass
Polymer shown in Table 1: 3.0% by mass

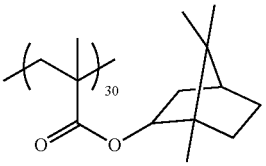
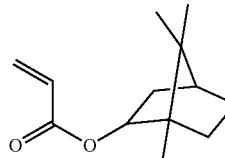 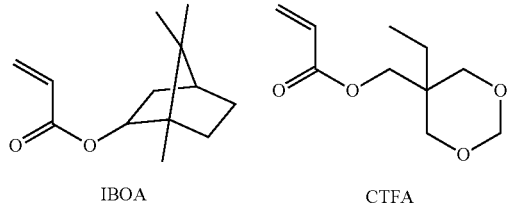

IBOA          CTFA

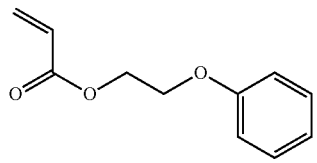

PEA

Preparation of C (cyan) Pigment Dispersion Liquid

The pigment (colorant), the dispersing agent, and the polymerizable monomer described below were mixed and stirred by using a mixer (L4R, manufactured by Silverson) at 2,500 revolutions/min for 10 minutes to prepare a mixture. Subsequently, the resulting mixture was placed in a bead mill disperser DISPERMAT LS (manufactured by VMA GETZMANN GMBH) and dispersed with YTZ balls (manufactured by Nikkato Corporation) having a diameter of 0.65 mm at 2,500 revolutions/min for six hours to prepare a pigment dispersion liquid (C).

Composition

Pigment: 20% by mass
  (C. I. Pigment Blue 15:3 (Cyan pigment), manufactured by Clariant)
Dispersing agent: 5% by mass
  (Solsperse 32000 (High-molecular-weight dispersing agent, manufactured by The Lubrizol Corporation)
Polymerizable monomer (2-Phenoxyethyl acrylate): 75% by mass Evaluation of Photo-Curable Ink A For the photo-curable ink A, the following evaluations were conducted. Table 1 shows the results.

Adhesion of Cured Film

Adhesion was evaluated by using the following sample (PVC) for evaluation and sample (PS) for evaluation.

Sample (PVC) for Evaluation

First, the photo-curable ink A was applied to a polyvinyl chloride (PVC) sheet serving as a substrate by using a No. 2 bar of a K Hand Coater manufactured by RK Print Coat Instruments Ltd. so as to have a thickness of 12 µm, thus obtaining a coating film. The coating film was cured by being irradiated with UV light (ultraviolet rays) by using a laboratory UV mini conveyor device CSOT (manufactured by GS Yuasa Power Supply Ltd.) including an ozoneless metal halide lamp MAN250L and set at a conveyor speed of 9.0 m/min and an exposure intensity of 2.0 W/cm$^2$ to obtain a cured film. The sample (PVC) for evaluation was obtained as described above.

Sample (PS) for Evaluation

The sample (PS) for evaluation was prepared as in the preparation of the sample (PVC) for evaluation except that the PVC sheet serving as a substrate was changed to a polystyrene (PS) sheet.

The following sheets were used as the PVC sheet and the PS sheet.

PVC sheet: "AVERY (registered trademark) 400 GLOSS WHITE PERMANENT" manufactured by Avery Dennison
PS sheet: "falcon hi impact polystyrene" manufactured by Robert Home Group Limited The cured films of the samples for evaluation were subjected to a cross-hatch test in accordance with ISO2409 (cross-cut method) and evaluated in accordance with the evaluation criteria described below. In the cross-hatch test, cutting was performed at a pitch of 1 mm to form a grid including 25 squares having a side of 1 mm.

In the evaluation criteria described below, 0 and 1 are in a range that is practically acceptable. In the evaluation criteria described below, the ratio (%) of squares that have flaked is a value calculated by the following formula. In the following formula, the total number of squares is 25.

Ratio (%) of squares that have flaked=[(number of squares that have flaked)/(total number of squares)]×100

Evaluation Criteria

0: The ratio (%) of squares that had flaked was 0%.
  1: The ratio (%) of squares that had flaked was more than 0% and 5% or less.
  2: The ratio (%) of squares that had flaked was more than 5% and 15% or less.
  3: The ratio (%) of squares that had flaked was more than 15% and 35% or less.
  4: The ratio (%) of squares that had flaked was more than 35% and 65% or less.
  5: The ratio (%) of squares that had flaked was more than 65%.

Pencil Hardness of Cured Film

Pencil hardness of a cured film was evaluated by using the above sample (PVC) for evaluation.

Specifically, for the cured film of the sample (PVC) for evaluation, a pencil hardness test was conducted by using UNI (registered trademark) manufactured by Mitsubishi Pencil Co., Ltd. in accordance with Japanese Industrial Standards (JIS) K5600-5-4 (1999).

In the test results, an acceptable range of the pencil hardness is HB or higher and preferably H or higher. Printed matter having a pencil hardness of B or lower is not preferable because a scratch may be formed during handling of the printed matter.

Blocking Resistance of Cured Film

Blocking resistance of cured films was evaluated by using the above sample (PVC) for evaluation.

Specifically, the sample (PVC) for evaluation was cut to have a size of 20 mm×20 mm to prepare an evaluation sample. Two evaluation samples each having this structure were prepared.

Next, the two evaluation samples were stacked such that the cured films were in contact with each other. Subsequently, in an environment at a temperature of 25° C. and a humidity of 50% RH, a load of 10 N was applied for 10 seconds in a direction in which the two evaluation samples were pressed to each other, and the evaluation samples were then peeled off. Next, each of the cured films of the two evaluation samples was observed. The presence or absence of the trace of bonding between the cured films and the degree of the trace of the bonding were visually observed. Blocking resistance of the cured films was evaluated in accordance with the evaluation criteria described below. Table 1 shows the results.

Evaluation Criteria

5: No trace of bonding between the cured films is observed, and blocking resistance of the cured films is very good.
  4: A trace of bonding between the cured films is observed in a range of more than 0% and less than 3% of the total area of the cured films. However, the blocking resistance of the cured films is at a level that does not cause any problem in practical application.
  3: A trace of bonding between the cured films is observed in a range of 3% or more and less than 10% of the total area of the cured films. However, the blocking resistance of the cured films is within an acceptable range in practical application.
  2: A trace of bonding between the cured films is observed in a range of 10% or more and less than 50% of the total area of the cured films. The blocking resistance of the cured films is out of an acceptable range in practical application.
  1: A trace of bonding between the cured films is observed in a range of 50% or more of the total area of the cured films. The blocking resistance of the cured films is particularly poor.

Ejection Stability

Ejection stability of the photo-curable ink A was evaluated by the following method using a commercially available ink jet recording apparatus (manufactured by FUJIFILM Corporation, LuxelJet (registered trademark) UV3600GT/XT: trade name) having a piezoelectric ink ejection head, and a polyethylene terephthalate (PET) film (manufactured by Toray Industries, Inc.) serving as a recording medium (substrate).

The photo-curable ink A was ejected onto the PET film by using the ink jet recording apparatus under the ejection conditions described below, and the landed photo-curable ink A was irradiated with ultraviolet (UV) light (irradiation dose: 1,000 mW/cm$^2$) to form a 100% solid image. This operation was continuously conducted for 60 minutes. The number of nozzles in which ink clogging occurred during the continuous ejection of the photo-curable ink A for 60 minutes (nozzle losses) was determined, and ejection stability was evaluated in accordance with the evaluation criteria below. In the evaluation criteria below, 5 or 4 is in a range that is practically acceptable.
Ejection Conditions
Number of channels: 318/head
Driving frequency: 4.8 kHz/dot
Ink droplet: 7 droplets, 42 pL
Temperature of head nozzle: 45° C.
Evaluation Criteria
  5: The number of nozzle losses is 0 or more and less than 2.
  4: The number of nozzle losses is 2 or more and less than 5.
  3: The number of nozzle losses is 5 or more and less than 7.
  2: The number of nozzle losses is 7 or more and less than 10.
  1: The number of nozzle losses is 10 or more.
Storage Stability
The photo-curable ink A (50 mL) was placed in a 50-mL glass vial, covered with a lid, and left to stand in a thermostatic chamber (60° C.) for four weeks. A viscosity of the photo-curable ink A was measured before and after standing in the above manner. A rate of increase of the viscosity after standing relative to the viscosity before standing was determined to evaluate storage stability of the photo-curable ink A in accordance with the evaluation criteria described below. In the evaluation criteria, 5 or 4 is in a range that is practically acceptable.
The viscosity of the photo-curable ink A was measured at a liquid temperature of 25° C. by using a VISCOMETER RE-85L (manufactured by Toki Sangyo Co., Ltd.) as a viscometer. Table 1 shows the results.
Evaluation Criteria
  5: The rate of increase of the viscosity after standing relative to the viscosity before standing is less than 10%.
  4: The rate of increase of the viscosity after standing relative to the viscosity before standing is 10% or more and less than 20%.
  3: The rate of increase of the viscosity after standing relative to the viscosity before standing is 20% or more and less than 30%.
  2: The rate of increase of the viscosity after standing relative to the viscosity before standing is 30% or more and less than 40%.
  1: The rate of increase of the viscosity after standing relative to the viscosity before standing is 40% or more.

Examples 2A to 38A and Comparative Example 1A

Photo-curable inks A (monofunctional monomer-based inks) were prepared as in Example 1A except that the type or the content of the polymer (1) in Example 1A was changed as shown in Table 1 below. The measurements and the evaluations were conducted as in Example 1A. Table 1 below shows the results of the measurements and the evaluations.
The content of the polymer (1) was changed by decreasing or increasing the amounts of monomers forming the polymer on the whole without changing the ratio of the monomers.

Comparative Example 2A

A photo-curable ink A (monofunctional monomer-based ink) was prepared as in Example 1A except that the polymer (1) in Example 1A was changed to the following comparative compound 1. The measurements and the evaluations were conducted as in Example 1A. Table 1 below shows the results of the measurements and the evaluations.

Comparative compound 1

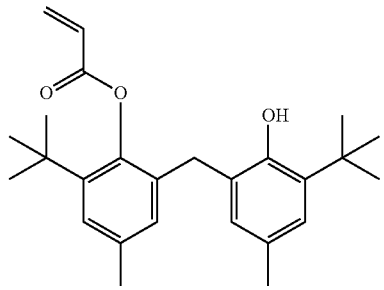

Example 1B

A photo-curable ink B (polyfunctional monomer-based ink) was prepared by mixing components having the composition described below. The measurements and the evaluations were conducted as in Example 1A by using the prepared photo-curable ink B. Table 2 below shows the results of the measurements and the evaluations. A ratio of the mass of the polymer with respect to the total mass of radical-polymerizable monomers is 4.3% by mass.
Composition
DPGDA below (Polyfunctional monomer): 25.0% by mass
HDDA below (Polyfunctional monomer): 20.0% by mass
DVE3 below (Polyfunctional monomer): 8.9% by mass
VEEA below (Polyfunctional monomer): 15.0% by mass
DPHA below (Polyfunctional monomer): 1.0% by mass
CN964: 2.0% by mass
  (manufactured by SARTOMER; Urethane oligomer having polymerizable group)
IRGACURE 819: 5.0% by mass
  (Photopolymerization initiator manufactured by BASF; Bis(2,4,6-trimethylbenzoyl)-phenylphosphine oxide (Acylphosphine oxide compound))
IRGACURE 184: 3.0% by mass
  (Photopolymerization initiator manufactured by BASF; 1-Hydroxy-cyclohexyl-phenyl-ketone (Carbonyl compound)
BP (Sensitizer; Benzophenone): 2.0% by mass
EDB (Sensitizer; Ethyl 4-(dimethylamino) benzoate: 1.0% by mass
ITX (Sensitizer; 2-Isopropylthioxanthone): 1.0% by mass
FIRSTCURE ST-1: 0.1% by mass
  (Polymerization inhibitor manufactured by Albemarle Corporation; Tris(N-nitroso-N-phenylhydroxylamine)aluminum salt)
BYK-UV3575: 1.0% by mass
  (Modified polydimethylsiloxane surfactant manufactured by BYK-Chemie GmbH)
C (cyan) pigment dispersion liquid described above: 12.0% by mass
Polymer shown in Table 2: 3.0% by mass

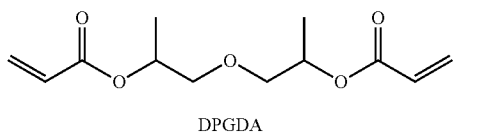
DPGDA

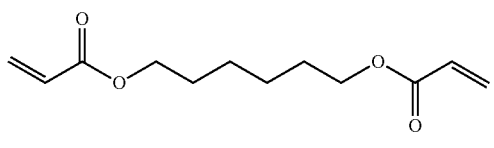
HDDA

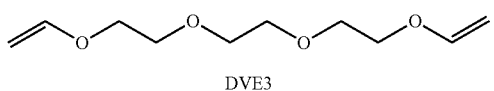
DVE3

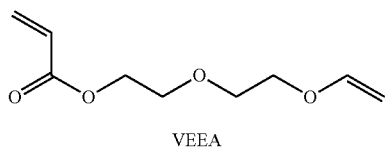
VEEA

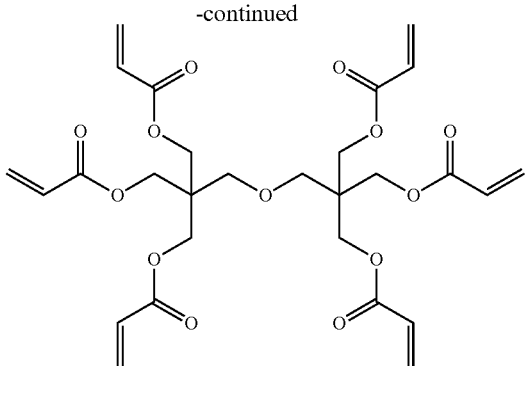
DPHA

Examples 2B to 25B and Comparative Example 1B

Photo-curable inks B (polyfunctional monomer-based inks) were prepared as in Example 1B except that the type or the content of the polymer (8) in Example 1B was changed as shown in Table 2 below. The measurements and the evaluations were conducted as in Example 1A. Table 2 below shows the results of the measurements and the evaluations.

Comparative Example 2B

A photo-curable ink B (polyfunctional monomer-based ink) was prepared as in Example 1B except that the polymer (8) in Example 1B was changed to the above comparative compound 1. The measurements and the evaluations were conducted as in Example 1A. Table 2 below shows the results of the measurements and the evaluations.

TABLE 1

| | | Photo-curable ink A (Monofunctional monomer-based ink) | | | | | | | | | | | |
|---|---|---|---|---|---|---|---|---|---|---|---|---|---|
| | | Polymer | | | | | | Content with respect to total amount of composition (mass %) | Evaluation results | | | | |
| | | Structural unit A | Structural unit B | Copolymerization ratio (mass %) | | | | | | | Adhesion | | |
| | Type | a1 | b1 b2 | a1 | b1 | b2 | Mw | | Pencil hardness | Blocking resistance | PVC | PS | Storage stability | Ejection stability |
| Example 1A | (1) | AO-1 | — — | 100 | — | — | 10000 | 3 | H | 5 | 1 | 1 | 5 | 4 |
| Example 2A | (2) | AO-2 | — — | 100 | — | — | 10000 | 3 | H | 5 | 1 | 1 | 5 | 4 |
| Example 3A | (3) | AO-3 | — — | 100 | — | — | 10000 | 3 | H | 5 | 1 | 1 | 5 | 4 |
| Example 4A | (4) | AO-4 | — — | 100 | — | — | 10000 | 3 | H | 5 | 1 | 1 | 5 | 4 |
| Example 5A | (5) | AO-5 | — — | 100 | — | — | 10000 | 3 | H | 5 | 1 | 1 | 5 | 4 |
| Example 6A | (6) | AO-6 | — — | 100 | — | — | 10000 | 3 | H | 5 | 1 | 1 | 5 | 4 |
| Example 7A | (7) | AO-7 | — — | 100 | — | — | 10000 | 3 | H | 5 | 1 | 1 | 5 | 4 |
| Example 8A | (8) | AO-1 | 3-1 — | 50 | 50 | — | 10000 | 3 | F | 5 | 0 | 0 | 5 | 4 |
| Example 9A | (9) | AO-2 | 3-1 — | 50 | 50 | — | 10000 | 3 | F | 5 | 0 | 0 | 5 | 4 |
| Example 10A | (10) | AO-3 | 3-1 — | 50 | 50 | — | 10000 | 3 | F | 5 | 0 | 0 | 5 | 4 |
| Example 11A | (11) | AO-4 | 3-1 — | 50 | 50 | — | 10000 | 3 | F | 5 | 0 | 0 | 5 | 4 |
| Example 12A | (12) | AO-5 | 3-1 — | 50 | 50 | — | 10000 | 3 | F | 5 | 0 | 0 | 5 | 4 |
| Example 13A | (13) | AO-6 | 3-1 — | 50 | 50 | — | 10000 | 3 | F | 5 | 0 | 0 | 5 | 4 |
| Example 14A | (14) | AO-7 | 3-1 — | 50 | 50 | — | 10000 | 3 | F | 5 | 0 | 0 | 5 | 4 |
| Example 15A | (15) | AO-1 | 3-8 — | 50 | 50 | — | 10000 | 3 | F | 5 | 0 | 0 | 5 | 4 |
| Example 16A | (16) | AO-1 | 3-9 — | 50 | 50 | — | 10000 | 3 | F | 5 | 0 | 0 | 5 | 4 |

TABLE 1-continued

| | | Photo-curable ink A (Monofunctional monomer-based ink) | | | | | | | | | | | | |
|---|---|---|---|---|---|---|---|---|---|---|---|---|---|---|
| | | Polymer | | | | | | | | Evaluation results | | | | |
| | | Structural unit A | Structural unit B | Copolymerization ratio (mass %) | | | | Content with respect to total amount of composition | | | Adhesion | | | |
| | Type | a1 | b1 | b2 | a1 | b1 | b2 | Mw | (mass %) | Pencil hardness | Blocking resistance | PVC | PS | Storage stability | Ejection stability |
| Example 17A | (17) | AO-1 | 3-2 | — | 50 | 50 | — | 10000 | 3 | F | 5 | 0 | 0 | 5 | 4 |
| Example 18A | (18) | AO-1 | 3-4 | — | 50 | 50 | — | 10000 | 3 | F | 5 | 0 | 0 | 5 | 4 |
| Example 19A | (19) | AO-1 | 3-1 | 4-3 | 50 | 20 | 30 | 10000 | 3 | F | 5 | 0 | 0 | 5 | 5 |
| Example 20A | (20) | AO-1 | 3-1 | 4-12 | 50 | 20 | 30 | 10000 | 3 | F | 5 | 0 | 0 | 5 | 5 |
| Example 21A | (21) | AO-1 | 3-1 | 4-1 | 50 | 20 | 30 | 10000 | 3 | F | 5 | 0 | 0 | 5 | 5 |
| Example 22A | (22) | AO-1 | 3-1 | 4-12 | 50 | 20 | 30 | 50000 | 3 | F | 5 | 0 | 0 | 4 | 4 |
| Example 23A | (23) | AO-1 | 3-1 | 4-12 | 50 | 20 | 30 | 40000 | 3 | F | 5 | 0 | 0 | 5 | 4 |
| Example 24A | (24) | AO-1 | 3-1 | 4-12 | 50 | 20 | 30 | 30000 | 3 | F | 5 | 0 | 0 | 5 | 5 |
| Example 25A | (25) | AO-1 | 3-1 | 4-12 | 50 | 20 | 30 | 2000 | 3 | H | 3 | 0 | 1 | 5 | 5 |
| Example 26A | (26) | AO-1 | 3-1 | 4-12 | 50 | 20 | 30 | 3000 | 3 | F | 4 | 0 | 1 | 5 | 5 |
| Example 27A | (27) | AO-1 | 3-1 | 4-1 | 10 | 30 | 60 | 10000 | 3 | H | 3 | 0 | 1 | 5 | 5 |
| Example 28A | (28) | AO-1 | 3-1 | 4-1 | 20 | 30 | 50 | 10000 | 3 | F | 4 | 0 | 1 | 5 | 5 |
| Example 29A | (29) | AO-1 | 3-1 | 4-1 | 30 | 30 | 40 | 10000 | 3 | F | 5 | 0 | 0 | 5 | 5 |
| Example 30A | (30) | AO-1 | 3-1 | 4-1 | 90 | 5 | 5 | 10000 | 3 | F | 5 | 0 | 0 | 4 | 4 |
| Example 31A | (31) | AO-1 | 3-1 | 4-1 | 80 | 10 | 10 | 10000 | 3 | F | 5 | 0 | 0 | 5 | 4 |
| Example 32A | (32) | AO-1 | 3-1 | 4-1 | 70 | 15 | 15 | 10000 | 3 | F | 5 | 0 | 0 | 5 | 5 |
| Example 33A | (33) | AO-1 | 3-1 | 4-1 | 50 | 20 | 30 | 10000 | 1 | H | 3 | 0 | 1 | 5 | 5 |
| Example 34A | (34) | AO-1 | 3-1 | 4-1 | 50 | 20 | 30 | 10000 | 1.5 | F | 4 | 0 | 1 | 5 | 5 |
| Example 35A | (35) | AO-1 | 3-1 | 4-1 | 50 | 20 | 30 | 10000 | 2 | F | 5 | 0 | 0 | 5 | 5 |
| Example 36A | (36) | AO-1 | 3-1 | 4-1 | 50 | 20 | 30 | 10000 | 9 | F | 5 | 0 | 0 | 4 | 4 |
| Example 37A | (37) | AO-1 | 3-1 | 4-1 | 50 | 20 | 30 | 10000 | 8 | F | 5 | 0 | 0 | 5 | 4 |
| Example 38A | (38) | AO-1 | 3-1 | 4-1 | 50 | 20 | 30 | 10000 | 7 | F | 5 | 0 | 0 | 5 | 5 |
| Comparative Example 1A | (39) | — | 3-1 | 4-3 | — | 50 | 50 | 10000 | 3 | 2B | 2 | 4 | 4 | 5 | 5 |
| Comparative Example 2A | (40) | Comparative compound 1 | | | | | | | 3 | 3B | 1 | 5 | 5 | 5 | 5 |

TABLE 2

Photo-curable ink B (Polyfunctional monomer-based ink)

| | | Polymer | | | | | | | | Evaluation | | | | |
|---|---|---|---|---|---|---|---|---|---|---|---|---|---|---|
| | | Structural unit A | Structural unit B | | Copolymerization ratio (mass %) | | | | Content with respect to total amount of composition | Pencil | Blocking | Adhesion | | Storage | Ejection |
| | Type | a1 | b1 | b2 | a1 | b1 | b2 | Mw | (mass %) | hardness | resistance | PVC | PS | stability | stability |
| Example 1B | (8) | AO-1 | 3-1 | — | 50 | 50 | — | 10000 | 3 | H | 5 | 0 | 0 | 5 | 4 |
| Example 2B | (9) | AO-2 | 3-1 | — | 50 | 50 | — | 10000 | 3 | H | 5 | 0 | 0 | 5 | 4 |
| Example 3B | (14) | AO-7 | 3-1 | — | 50 | 50 | — | 10000 | 3 | H | 5 | 0 | 0 | 5 | 4 |
| Example 4B | (17) | AO-1 | 3-2 | — | 50 | 50 | — | 10000 | 3 | H | 5 | 0 | 0 | 5 | 4 |
| Example 5B | (18) | AO-1 | 3-4 | — | 50 | 50 | — | 10000 | 3 | H | 5 | 0 | 0 | 5 | 4 |
| Example 6B | (19) | AO-1 | 3-1 | 4-3 | 50 | 20 | 30 | 10000 | 3 | F | 5 | 0 | 0 | 5 | 5 |
| Example 7B | (20) | AO-1 | 3-1 | 4-12 | 50 | 20 | 30 | 10000 | 3 | F | 5 | 0 | 0 | 5 | 5 |
| Example 8B | (21) | AO-1 | 3-1 | 4-1 | 50 | 20 | 30 | 10000 | 3 | F | 5 | 0 | 0 | 5 | 5 |
| Example 9B | (22) | AO-1 | 3-1 | 4-12 | 50 | 20 | 30 | 50000 | 3 | F | 5 | 0 | 0 | 4 | 4 |
| Example 10B | (23) | AO-1 | 3-1 | 4-12 | 50 | 20 | 30 | 40000 | 3 | F | 5 | 0 | 0 | 5 | 4 |
| Example 11B | (24) | AO-1 | 3-1 | 4-12 | 50 | 20 | 30 | 30000 | 3 | F | 5 | 0 | 0 | 5 | 5 |
| Example 12B | (25) | AO-1 | 3-1 | 4-12 | 50 | 20 | 30 | 2000 | 3 | H | 3 | 0 | 1 | 5 | 5 |
| Example 13B | (26) | AO-1 | 3-1 | 4-12 | 50 | 20 | 30 | 3000 | 3 | F | 4 | 0 | 1 | 5 | 5 |
| Example 14B | (27) | AO-1 | 3-1 | 4-1 | 10 | 30 | 60 | 10000 | 3 | H | 3 | 0 | 1 | 5 | 5 |
| Example 15B | (28) | AO-1 | 3-1 | 4-1 | 20 | 30 | 50 | 10000 | 3 | F | 4 | 0 | 1 | 5 | 5 |
| Example 16B | (29) | AO-1 | 3-1 | 4-1 | 30 | 30 | 40 | 10000 | 3 | F | 5 | 0 | 0 | 5 | 5 |
| Example 17B | (30) | AO-1 | 3-1 | 4-1 | 90 | 5 | 5 | 10000 | 3 | F | 5 | 0 | 0 | 4 | 4 |
| Example 18B | (31) | AO-1 | 3-1 | 4-1 | 80 | 10 | 10 | 10000 | 3 | F | 5 | 0 | 0 | 5 | 4 |
| Example 19B | (32) | AO-1 | 3-1 | 4-1 | 70 | 15 | 15 | 10000 | 3 | F | 5 | 0 | 0 | 5 | 5 |
| Example 20B | (33) | AO-1 | 3-1 | 4-1 | 50 | 20 | 30 | 10000 | 1 | H | 3 | 0 | 1 | 5 | 5 |
| Example 21B | (34) | AO-1 | 3-1 | 4-1 | 50 | 20 | 30 | 10000 | 1.5 | F | 4 | 0 | 1 | 5 | 5 |
| Example 22B | (35) | AO-1 | 3-1 | 4-1 | 50 | 20 | 30 | 10000 | 2 | F | 5 | 0 | 0 | 5 | 5 |
| Example 23B | (36) | AO-1 | 3-1 | 4-1 | 50 | 20 | 30 | 10000 | 9 | F | 5 | 0 | 0 | 4 | 4 |
| Example 24B | (37) | AO-1 | 3-1 | 4-1 | 50 | 20 | 30 | 10000 | 8 | F | 5 | 0 | 0 | 5 | 4 |
| Example 25B | (38) | AO-1 | 3-1 | 4-1 | 50 | 20 | 30 | 10000 | 7 | F | 5 | 0 | 0 | 5 | 5 |
| Com. Ex. 1B | (39) | — | 3-1 | 4-3 | — | 50 | 50 | 10000 | 3 | 2B | 2 | 4 | 4 | 5 | 5 |
| Com. Ex. 2B | (40) | Comparative compound 1 | | | | | | | 3 | 3B | 1 | 5 | 5 | 5 | 5 |

Com. Ex.: Comparative Example

In Tables 1 and 2, the symbol "—" indicates that the corresponding component is not contained.

As shown in Tables 1 and 2, in Examples, blocking of cured portions was suppressed to be low, and good hardness and good adhesion to substrates were obtained.

In Examples 8A to 18A, in which the polymer had the structural unit a1 and the structural unit b1, the pencil hardness and the adhesion of the image further improved. Examples 19A to 21A, etc., in which the polymer further has, as the structural unit B, the structural unit b2 having a cyclic hydrocarbon group, show good ejection stability of the ink. In Examples 22A to 24A and 26A, in which the polymer had a weight-average molecular weight of from 3,000 to 50,000, the pencil hardness, the blocking resistance, and the adhesion were better than those in Example 25A, in which the weight-average molecular weight was relatively low. Furthermore, when the weight-average molecular weight was 40,000 or less, the storage stability of the ink was further improved as in Example 23A. When the weight-average molecular weight was 30,000 or less, the ejection stability of the ink was improved as in Example 24A.

As is clear from Examples 27A to 32A, the percentage of the "structural unit represented by General Formula 1" in the polymer was suitably from 30% by mass to 90% by mass from the viewpoint of the hardness, blocking resistance, and adhesion of the image. The percentage was more suitably from 30% by mass to 80% by mass and particularly suitably from 30% by mass to 70% by mass from the viewpoint that good storage stability and good ejection stability of the ink were also achieved.

In Examples 35A, 37A, and 38A, in which the content of the polymer was from 2% by mass to 8% by mass, in addition to the hardness, blocking resistance, and adhesion, the storage stability and ejection stability of the ink were also good. Referring to the results, a more preferred content of the polymer was from 2% by mass to 7% by mass.

In contrast, in Comparative Examples 1A and 2A, in which a polymer having no "structural unit represented by General Formula 1" and the comparative compound 1, which was a low-molecular compound, were used respectively, all the hardness, blocking resistance, and adhesion to the substrates were poor.

Examples 1B to 25B and Comparative Examples 1B and 2B also showed results similar to those described above.

The entire contents of the disclosure of Japanese Patent Application No. 2017-034089 filed on Feb. 24, 2017 are incorporated in the present specification by reference.

All documents, patent applications, and technical standards described herein are incorporated by reference in the present specification to the same degree as when individual documents, patent applications, and technical standards are incorporated by reference specifically and individually.

What is claimed is:

1. A photo-curable ink composition comprising:
   a polymer including a structural unit represented by General Formula 1 below; and
   a radical-polymerizable monomer,
   wherein a total content of a monofunctional radical-polymerizable monomer and a bifunctional radical-polymerizable monomer is 60% by mass or more with respect to a total amount of the composition:

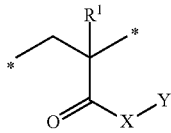

General Formula 1 wherein, in General Formula 1: $R^1$ represents a hydrogen atom or a methyl group; X represents an oxygen atom or $-NR^2-$, $R^2$ representing a hydrogen atom or an alkyl group having 1 to 8 carbon atoms; Y represents a group including at least one selected from the group consisting of a thioether structure, a phosphorus atom, and a hindered phenol structure; and * represents a bonding site.

2. The photo-curable ink composition according to claim 1, wherein the structural unit represented by General Formula 1 includes at least one structural unit selected from the group consisting of General Formulae 2 to 4 below:

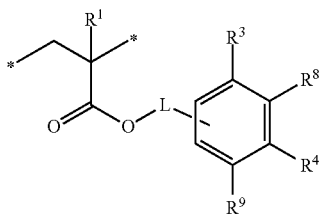

General Formula 2

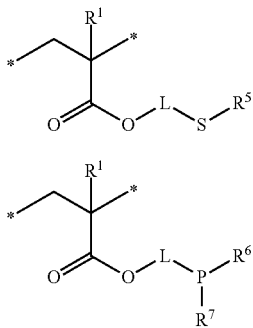

General Formula 3

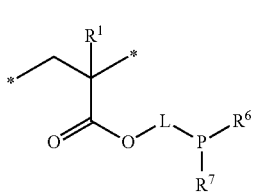

General Formula 4 wherein, in General Formulae 2 to 4: $R^1$ represents a hydrogen atom or a methyl group; L represents a single bond or a divalent linking group; $R^3$, $R^4$, $R^5$, $R^6$, and $R^7$ each independently represent a linear, branched, alicyclic, or aromatic hydrocarbon group having 1 to 18 carbon atoms; $R^6$ and $R^7$ may be bonded to each other to form a ring structure; one of $R^8$ or $R^9$ represents a hydroxy group, and the other represents a hydrogen atom; and * represents a bonding site.

3. The photo-curable ink composition according to claim 1, wherein the polymer includes at least one selected from the group consisting of a structural unit having an amide structure and a structural unit having a cyclic hydrocarbon group other than the structural unit represented by General Formula 1.

4. The photo-curable ink composition according to claim 1, wherein a ratio of the structural unit represented by General Formula 1 is 10% by mass or more with respect to a total mass of all structural units in the polymer.

5. The photo-curable ink composition according to claim 4, wherein the ratio of the structural unit represented by General Formula 1 is from 30% by mass to 70% by mass with respect to the total mass of all the structural units in the polymer.

6. The photo-curable ink composition according to claim 1, wherein the polymer has a weight-average molecular weight of from 1,000 to 50,000.

7. The photo-curable ink composition according to claim 1, wherein a content of the polymer is from 0.5% by mass to 10.0% by mass with respect to a total mass of the photo-curable ink composition.

8. The photo-curable ink composition according to claim 1, wherein a ratio of a content of the polymer to a content of the radical-polymerizable monomer is from 3% by mass to 5% by mass.

9. The photo-curable ink composition according to claim 1, further comprising a photopolymerization initiator.

10. A method for forming an image, comprising:
applying the photo-curable ink composition according to claim 1 to a recording medium; and
irradiating the photo-curable ink composition applied to the recording medium with an active energy ray.

* * * * *